United States Patent
Nagata et al.

(10) Patent No.: US 9,307,423 B2
(45) Date of Patent: Apr. 5, 2016

(54) METHOD FOR COORDINATING INTER-CELL INTERFERENCE IN HETEROGENEOUS NETWORK AND HETEROGENEOUS NETWORK

(75) Inventors: Satoshi Nagata, Tokyo (JP); Jing Wang, Beijing (CN); Yu Jiang, Beijing (CN); Xiaoming She, Beijing (CN); Lan Chen, Beijing (CN); Hirohito Suda, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 97 days.

(21) Appl. No.: 14/131,370

(22) PCT Filed: Jul. 9, 2012

(86) PCT No.: PCT/JP2012/067512
§ 371 (c)(1),
(2), (4) Date: Mar. 5, 2014

(87) PCT Pub. No.: WO2013/008794
PCT Pub. Date: Jan. 17, 2013

(65) Prior Publication Data
US 2014/0169275 A1 Jun. 19, 2014

(30) Foreign Application Priority Data

Jul. 13, 2011 (CN) .......................... 2011 1 0204385
Jul. 26, 2011 (CN) .......................... 2011 1 0218060
Aug. 26, 2011 (CN) .......................... 2011 1 0265826

(51) Int. Cl.
*H04W 24/02* (2009.01)
*H04W 16/14* (2009.01)
*H04W 72/08* (2009.01)
*H04W 72/04* (2009.01)

(52) U.S. Cl.
CPC .............. *H04W 24/02* (2013.01); *H04W 16/14* (2013.01); *H04W 72/082* (2013.01); *H04W 72/0426* (2013.01)

(58) Field of Classification Search
CPC ......... H04B 15/00; H04B 7/26; H04W 24/10; H04W 72/04; H04W 40/00; H04W 28/26; H04W 72/08; H04L 7/00
USPC ................. 370/312, 329, 330, 252, 254, 332; 455/422.1, 411, 67.14, 501, 509, 524
See application file for complete search history.

(56) References Cited

U.S. PATENT DOCUMENTS

2010/0267408 A1* 10/2010 Lee et al. ...................... 455/509

OTHER PUBLICATIONS

TSG-RAN WG1 Meeting#64, Taipei, Taiwan, Feb. 21-25, 2011, LG Electronics, Refinements of CoMP Scenario 3 and 4, 6.3.1.2; R4-111104.*
3GPP TSG RAN WG1 Meeting#65, Barcelona, Spain, May 9-13, 2011, 6.3.1.2; Samsung, "Full Buffer Evaluation Results for CoMP Scenario 3 and 4", R1-111466.*
Decision to Grant Patent issued in corresponding Japanese Application No. 2013-523944, mailed Nov. 4, 2014 (4 pages).

* cited by examiner

Primary Examiner — Charles C Jiang
Assistant Examiner — Wali Butt
(74) Attorney, Agent, or Firm — Osha Liang LLP

(57) ABSTRACT

Provided are a method for coordinating inter-cell interference in a heterogeneous network (HetNet) and the heterogeneous network. The method includes: forming M normal base stations and low-power nodes within coverage of the respective normal base stations in the heterogeneous network into a coordinated group; combining mute/non-mute states of bandwidths of the M normal base stations to obtain a plurality of states of the coordinated group; a user of each of the normal base stations feeding at least one first CQI back to the normal base station; a user of each of the low-power nodes feeding one or more second CQIs back to the low-power node; using the first CQI and the second CQIs as a basis to make capacity estimation of the coordinated group; and setting the mute/non-mute states of the bandwidths of the M normal base stations in accordance with a state of the coordinated group corresponding to an optimal system capacity so as to perform data transmission. In the method for coordinating interference provided by the present invention, M transmission points each including one or more normal base stations and low-power nodes covered by the respective normal base stations can be formed into a coordinated group, thereby extending processing for the normal base stations up to all the transmission points in the coordinated group.

26 Claims, 21 Drawing Sheets

METHOD FOR COORDINATING INTER-CELL INTERFERENCE IN HETEROGENEOUS NETWORK AND HETEROGENEOUS NETWORK

TECHNICAL FIELD

The present invention relates to a radio communication field, and particularly, to a method for coordinating inter-cell interference in a heterogeneous network and the heterogeneous network.

BACKGROUND ART

A heterogeneous network (HetNet) has been considered a development of the current radio network coverage technology. In the heterogeneous network, there are arranged, in addition to normal base stations (e.g., macro base stations (macro eNodeB)) used in 2G, 3G, 4G, LTE or LTE-A network, many low-power nodes (e.g., pico base stations (pico eNodeB), femto base stations (femto eNodeB), relay stations, micro base stations (micro eNodeB) etc.). These low-power nodes contribute to improvement in cell's total throughput and cell coverage. Since a normal base station and a low-power node are both transmission points in a heterogeneous network, a user connected to such a low-power node suffers from strong interference from the normal base station which covers the same area as the low-power node. Particularly, once the coverage of the low-power node is extended by applying a fixed offset (bias), a user of the normal base station may access the low-power node to become a low-power node user, who thereby may suffer from stronger interference from the normal base station. Accordingly, in the heterogeneous network, there is a need to use enhanced inter-cell interference coordination (eICIC).

In the current 3GPP standardization, a study about eICIC is mainly focused on reduction in interference of a normal base station which a low-power node user suffers from by switching the normal base station between mute and non-mute per time interval. For example, in 3GPP Rel. 10, semi-static eICIC has been studied intensively. In this technique, the normal base station is controlled as to open and closed (mute/non-mute) states based on a preset transmission pattern. Such a pattern may be called ABS pattern (almost blank subframe pattern) or muting pattern. However, if the transmission pattern is fixed in each transmission time interval (TTI), it is not optimal for cell total throughput. Accordingly, there is proposed a dynamic eICIC technique.

According to the flow of the dynamic eICIC, in order to improve cell total throughputs, the normal base station dynamically determines the mute/non-mute state of data transmission of the own station in each TTI or over a plurality of TTIs. For example, in the dynamic eICIC, in determining the mute/non-mute state of the macro base station, there is a need to compare cell performance between a case of macro base station without transmission (macro mute) and a case of macro base station with transmission (macro non-mute). Here, the mute state of the macro base station corresponds to the case of macro base station without transmission and the non-mute state of the macro base station corresponds to the case of macro base station with transmission. In transmission decision (muting decision), the macro base station compares a sum of capacities of all transmission points for the case of macro base station without transmission with a sum of capacities of all transmission points for the case of macro base station with transmission, and selects the state of higher capacity. As compared with the semi-static eICIC, some improvement of performance is expected in the dynamic eICIC.

FIG. 1a is a view illustrating cover areas of a macro base station and each low-power node in the case of macro base station without transmission (mute state), where the system performance in this case represents a sum of capacities of all users accessing to low-power nodes. FIG. 1b is a view illustrating cover areas of a macro base station and each low-power node in the case of macro base station with transmission (non-mute state), where the system performance in this case represents a sum of capacities of all users accessing to the low-power nodes and all macro users. Here, each macro user is a user accessing the macro base station. Comparing capacities of these two cases, a case of higher capacity is selected to be an actual state of the macro base station. Here, the area enclosed in the solid line represents coverage of the macro base station, the coverage that is not filled (blank) represents the mute state of the macro base station, and the coverage that is filled in a lattice pattern represents the non-mute state of the macro base station. The area enclosed in the dotted line represents coverage of each low-power node.

Specifically, the capacities of the above-mentioned two cases are estimated by the transmission points based on channel quality indicators (CQIs) fed back from users. FIG. 2 is a view illustrating the process of a user feeding back a CQI to a transmission point. The feedback time interval is set by the system, for example, 10 ms. In FIG. 2, the macro user feeds a CQI for the non-mute state of the macro base station and after a 6-ms propagation delay, the macro base station receives the CQI and estimates a capacity that can be obtained when the own station selects the non-mute state in the next transmission time. Specifically, the macro base station determines the mute/non-mute state of the own station at the time 6 ms based on the CQI at the time 0 ms received from a macro user. Likewise, the macro base station determines the mute/non-mute state of the own station at the time 16 ms based on the CQI at the time 10 ms received from the macro user. A low-power node user feeds back two representative CQIs of the respective cases of non-mute and mute states of the macro base station that covers the low-power node. Here, each unfilled column represents a CQI for the mute state and each filled column represents a CQI for the non-mute state. After receiving these two CQIs, the low-power node can estimate a sum of capacities of all users of the own station for each of the non-mute state and the mute state. Then, the macro base station compares the capacities and executes the transmission decision.

SUMMARY OF INVENTION

Technical Problem

However, for the dynamic eICIC technique, there are still some problems that restrict improvement of the system performance. First, when the macro base station adopts independent decision of mute/non-mute state, there is highly possibly caused an error. In the conventional technique, there may exist a plurality of macro base stations over a heterogeneous network. Each of the macro base stations determines the mute/non-mute state for data transmission, based on received user feedback information independently. However, in actual transmission, the mute/non-mute state of the macro base station may vary. Such variation cannot be anticipated for surrounding macro base stations, which causes rapid undulations of interference. Therefore, if a macro base station selects the state of higher capacity at the decision step, unpredictable interference undulations may occur in actual transmission due to variation in mute/non-mute state of surrounding macro base stations, which makes it difficult to optimize the performance with the decided state of the macro base station. Next, some mismatch between a CQI used in scheduling and a CQI used in actual transmission affects the system throughputs. Specifically, rapid change in mute/non-mute state causes mismatch between channel state information used in scheduling and the actual channel transmission state. In this way, a modulation and coding set (MCS) level selected by a scheduled user does not match the actual channel. If the MCS level is relatively high while the actual channel state is relatively bad, an error bit rate for user's data reception is relatively high and the system throughput becomes lowered. If the MCS level is relatively low while the actual channel state is relatively good, the actual transmission data becomes less than data that can be transmitted when the matched MCS level is adopted. That is, in any case, there is reduction in system throughputs.

Solution to Problem

The present invention provides a method for coordinating inter-cell interference in a heterogeneous network and also provides the heterogeneous network.

One aspect of the present invention is a method for coordinating inter-cell interference in a heterogeneous network (HetNet), comprising:

a step A of forming M normal base stations (M is greater than 1) and low-power nodes within coverage of the respective normal base stations in the heterogeneous network into a coordinated group;

a step B of combining mute/non-mute states of bandwidths of the M normal base stations to obtain a plurality of states of the coordinated group;

a step C of a user of each of the normal base stations in the coordinated group, feeding at least one first channel quality indicator (CQI) corresponding to the states of the coordinated group back to the normal base station;

a step D of a user of each of the low-power nodes covered by the normal base stations in the coordinated group, feeding one or more second CQIs corresponding to the states of the coordinated group back to the low-power node;

a step E of using the at least one first CQI and the one or more second CQIs as a basis to make capacity estimation of the coordinated group and obtaining a plurality of system capacities corresponding to the respective states of the coordinated group; and a step F of setting the mute/non-mute states of the bandwidths of the M normal base stations in accordance with a state of the coordinated group corresponding to an optimal system capacity so as to perform data transmission.

The states of the coordinated group in the step B include a state where the M normal base stations are all non-mute and a state where the M normal base stations are all mute, in the step C, the user of the normal base station feeds back the first CQI of the state where the M normal base stations are all non-mute, in the step D, the user of the low-power node feeds back two second CQIs of the state where the M normal base stations are all non-mute and the state where the M normal base stations are all mute, and the first CQI and the second CQIs are all related to interference strength outside the coordinated group.

The states of the coordinated group in the step B include any combinations of the mute/non-mute states of the M normal base stations, in the step C, the user of each of the normal base stations decides M first CQIs, the first CQIs being related to signal strength of j-th (j=1, 2, . . . , M) normal base stations and interference strength outside the coordinated group, and in the step D, the user of each of the low-power nodes decides M+1 second CQIs, the second CQIs being related to signal strength of the low-power node, signal strength of the respective normal base stations in the coordinated group and the interference strength outside the coordinated group.

The step E comprises:

each of the normal base stations in the coordinated group updating the M first CQIs fed back from the user of own station to be CQIs in one-to-one correspondence with the mute/non-mute sates of any combinations of the mute/non-mute states of other normal base stations in the coordinated group;

each of the low-power nodes updating the M+1 second CQIs fed back from the user of own station to be CQIs in one-to-one correspondence with the states of the coordinated group; and estimating the system capacities of the coordinated group in the respective states based on the updated CQIs.

The states of the coordinated group in the step B are determined by a number of mute normal base stations and the number of mute normal base stations corresponding to an i-th state of the coordinated group is i (i=0, 1, . . . , M), in the step C, the user of each of the normal base stations decides M first CQIs and an i-th first CQI (i=0, 1, . . . , M−1) is related to signal strength of the normal base station to which the user belongs, signal strength of another non-mute normal base station in the i-th state of the coordinated group and interference strength outside the coordinated group;

in the step D, the user of each of the low-power nodes decides M+1 second CQIs and an i-th second CQI (i=0, 1, . . . , M) is related to signal strength of the low-power node, the signal strength of the non-mute normal base station in the i-th state of the coordinated group, and the interference strength outside the coordinated group.

The i-th first CQI is a minimal CQI in the i-th state of the coordinated group measured by the user of the normal base station, and the i-th second CQI is a minimal CQI in the i-th state of the coordinated group measured by the user of the low-power node.

Each of the states of the coordinated group in the step B corresponds to one of selections by, once a number $N_{close}$ of mute normal base stations is decided, selecting $N_{close}$ normal base stations arbitrarily from the M normal base stations and making the $N_{close}$ normal base stations mute, a value of $N_{close}$ being any of 1, . . . , M−1, in the step C, the user of each of the normal base stations decides M first CQIs, each of the first CQIs being related to signal strength of the normal base station to which the user belongs, signal strength of another non-mute normal base station in the corresponding state of the coordinated group, and interference strength outside the coordinated group, and in the step D, the user of each of the low-power nodes decides M+1 second CQIs, the second CQIs being related to signal strength of the low-power node, signal strength of non-mute normal base stations in the corresponding state of the coordinated group, the interference strength outside the coordinated group.

The step C further comprises the user of each of the normal base stations feeding the determined M first CQIs back to the normal base station, and the step D further comprises the user of each of the low-power nodes feeding the determined M+1 second CQIs back to the low-power node, or the step C further comprises the user of each of the normal base stations grouping and comparing the determined M first CQIs, selecting a minimal first CQI from each group and feeding the first CQI back to the normal base station, and the step D further comprises the user of each of the low-power nodes grouping and comparing the determined M+1 second CQIs, selecting a minimal second CQI from each group and feeding the second CQI back to the low-power node.

The interference strength outside the coordinated group is actual interference strength measured with actual mute/non-mute states of normal base stations outside the coordinated group by a corresponding user, or estimated interference strength measured by the corresponding user assuming the normal base stations outside the coordinated group are all non-mute.

The step C further comprises the user of each of the normal base stations assuming a plurality of states of the coordinated group shiftable from a state of the coordinated group at a last transmission time as the states of the coordinated group at a current feedback time and feeding first CQIs corresponding to the states of the coordinated group at the current feedback time back to the normal base station, and the step D further comprises the user of each of the low-power nodes assuming a plurality of states of the coordinated group shiftable from the state of the coordinated group at the last transmission time as the states of the coordinated group at the current feedback time and feeding second CQIs corresponding to the states of the coordinated group at the current feedback time back to the low-power node.

The step C further comprises the user of each of the normal base stations deciding $N_{feed1}$ first CQIs to feed back, selecting strongest n1 (n1 meets $N_{feed1} > n1 \geq 1$) first CQIs from the $N_{feed1}$ first CQIs and feeding the strongest n1 first CQIs back to the normal base station, and the step D further comprises the user of each of the low-power nodes deciding $N_{feed2}$ second CQIs to feed back, selecting strongest n2 (n2 meets $N_{feed2} > n2 \geq 1$) second CQIs from the $N_{feed2}$ second CQIs and feeding the strongest n2 second CQIs back to the low-power node.

The step B further comprises dividing a whole band of each of the normal base stations into K subband groups (K is greater than 1), each of the subband groups including one or a plurality of subbands, and combining the mute/non-mute states of the M normal base stations in each of the subband groups to obtain the states of the coordinated group.

The step A further comprises providing a control section configured to be shared by the M normal base stations, and
the step E further comprises:
one of each of the low-power nodes, a normal base station that covers the low-power node and the control section, using the one or more second CQIs fed back from the user of the low-power node as a basis to make capacity estimation of the low-power node in the states
the normal base station or the control section, using the at least one first CQI fed back from the user of the normal base station and a capacity estimation result of the low-power node covered by the normal base station as a basis to make capacity estimation of the normal base station in the states of the coordinated group, and
the control section using the capacity estimation result of each of the normal base stations as a basis to make capacity estimation of the coordinated group and obtain the system capacities corresponding to the states of the coordinated group.

The step A further comprises selecting a decision normal base station from the M normal base stations and setting each normal base station other than the decision normal base station to be another normal base station, and
the step E further comprises:
one of each of the low-power nodes, a normal base station that covers the low-power node and the decision normal base station, using the one or more second CQIs fed back from the user of the low-power node as a basis to make capacity estimation of the low-power node in the states
the other normal base station or the decision normal base station, using the at least one first CQI fed back from the user of the other normal base station and a capacity estimation result of the low-power node covered by the other normal base station as a basis to make capacity estimation of the other normal base station in the states of the coordinated group, and
the decision normal base station using the at least one first CQI fed back from the user of own station and a capacity estimation result of the low-power node covered by the decision normal base station as a basis to make capacity estimation of the decision normal base station in the states of the coordinated group and using a capacity estimation result of each of the normal base stations as a basis to make capacity estimation of the coordinated group and obtain the system capacities corresponding to the states of the coordinated group.

In the step F, an actual CQI is decided corresponding to the state of the coordinated group of the optimal system capacity and data scheduling and transmission is performed in accordance with the actual CQI.

The method further comprises:
deciding a degree of importance of the first CQI or the second CQIs;
setting a feedback cycle of each of the first CQI and the second CQIs in accordance with the degree of importance in such a manner that the feedback cycle of a CQI of higher degree of importance is short and the feedback cycle of a CQI of lower degree of importance is long; or
using the CQI of higher degree of importance as a reference CQI to send feedback directly to a corresponding transmission point and to send a difference between the reference CQI and the CQI of lower degree of importance as feedback to a corresponding transmission point.

The step A further comprises forming M normal base stations co-located in the heterogeneous network and corresponding low-power nodes into the coordinated group or forming neighbor M normal base stations in the heterogeneous network and corresponding low-power nodes into the coordinated group.

The method further comprises calculating actual transmission power of the normal base stations as P (P falls within [0, 1])×specified transmission power and deciding the mute/non-mute state based on the actual transmission power.

Another aspect the present invention is a heterogeneous network comprising:
at least one coordinated group including M normal base stations (M is greater than 1) and low-power nodes within coverage of the respective normal base stations; and
a control section configured to be shared by the M normal base stations, wherein
at least one normal base station of the normal base stations in the coordinated group covers one or a plurality of low-power nodes,
each of the normal base stations in the coordinated group receives at least one first channel quality indicator (CQI) corresponding to a plurality of states of the coordinated group fed back from a user of own station to the normal base station, the states of the coordinated group being obtained by combining mute/non-mute states of bandwidths of the M normal base stations, each of the low-power nodes covered by the respective normal base stations in the coordinated group receives one or more second CQIs corresponding to the states of the coordinated group fed back from a user of own station to the low-power node, and the control section uses the at least one first CQI and the one or more second CQIs as a basis to make capacity estimation of the coordinated group, obtains a plurality of system capacities corresponding to the respective states of the coordinated group, and sets the mute/non-mute states of the bandwidths of the M normal base stations in accordance with a state of the coordinated group corresponding to an optimal system capacity so as to perform data transmission.

Each of the low-power nodes performs calculation and updating of the one or more second CQIs fed back from the user of own station, uses the updated CQIs as a basis to make capacity estimation of the low-power node and provides a capacity estimation result of the low-power node in the states of the coordinated group to the normal base station that covers the low-power node, each of the normal base stations performs calculation and updating of the at least one first CQI fed back from the user of own station, uses the updated CQI and the capacity estimation result of the low-power node covered by the normal base station as a basis to make capacity estimation of the normal base station and provides a capacity estimation result of the normal base station in the states of the coordinated group to the control section, and the control section uses the capacity estimation result of each of the normal base stations as a basis to make capacity estimation of the coordinated group and obtains the system capacities corresponding to the respective states of the coordinated group.

Yet another aspect of the present invention is a heterogeneous network comprising at least one coordinated group including M normal base stations (M is greater than 1) and low-power nodes within coverage of the respective normal base stations, wherein one of the normal base stations is a decision normal base station and each normal base station other than the decision normal base station is another normal base station, at least one normal base station of the normal base stations in the coordinated group covers one or a plurality of low-power nodes, each of the normal base stations in the coordinated group receives at least one first channel quality indicator (CQI) corresponding to a plurality of states of the coordinated group fed back from a user of own station to the normal base station, the states of the coordinated group being obtained by combining mute/non-mute states of bandwidths of the M normal base stations, each of the low-power nodes covered by the respective normal base stations in the coordinated group receives one or more second CQIs corresponding to the states of the coordinated group fed back from a user of own station to the low-power node, and the decision normal base station uses the at least one first CQI and the one or more second CQIs as a basis to make capacity estimation of the coordinated group, obtains a plurality of system capacities corresponding to the respective states of the coordinated group, and sets the mute/non-mute states of the bandwidths of the M normal base stations in accordance with a state of the coordinated group corresponding to an optimal system capacity so as to perform data transmission.

Each of the low-power nodes performs calculation and updating of the one or more second CQIs fed back from the user of own station, uses the updated CQIs as a basis to make capacity estimation of the low-power node and provides a capacity estimation result of the low-power node in the states of the coordinated group to the normal base station that covers the low-power node, the other normal base station uses the at least one first CQI fed back from the user of own station and the capacity estimation result of the low-power node covered by the other normal base station as a basis to make capacity estimation of the other normal base station and provides a capacity estimation result of the other normal base station in the states of the coordinated group to the decision normal base station, and the decision normal base station uses the at least one first CQI fed back from a user of own station and a capacity estimation result of a low-power node covered by the decision normal base station as a basis to make capacity estimation of the coordinated group and obtains the system capacities corresponding to the respective states of the coordinated group.

Yet another aspect of the present invention is a method for coordinating inter-cell interference in a heterogeneous network (HetNet), comprising the steps of:

a step A2 of forming a first normal base station and one or a plurality of low-power node covered by the first normal base station in the heterogeneous network into a coordinated group;

a step B2 of a user of the first normal base station measuring signal strength of the first normal base station and signal strength of one or more interference normal base stations around the user and feeding back a plurality of corresponding third channel quality indicators (CQIs);

a step C2 of a user of each low-power node covered by the first normal base station measuring signal strength of one or a plurality of normal base stations around the user and feeding back a plurality of corresponding fourth CQIs;

a step D2 of using the third CQIs and the fourth CQIs as a basis to make capacity estimation of the first normal base station in each of a mute state and a non-mute state, selecting a state of higher system capacity out of the mute state and the non-mute state and setting the state as an actual transmission state of the first normal base station; and a step E2 of the first normal base station obtaining an actual transmission state of each interference normal base station, using the third CQIs and the fourth CQIs as a basis to decide actual CQIs corresponding to the actual transmission state of the first normal base station and the actual transmission state of the interference normal base station and performing data scheduling and transmission in accordance with the actual CQI.

The step B2 further comprises setting a measurement feedback group in advance for all users of the first normal base station and measuring signal strength of the normal base station in the measurement feedback group so that each of the users of the first normal base station can feed back the corresponding third CQIs.

The step E2 further comprises, when the third CQIs and the fourth CQIs are the actual CQIs corresponding to the actual transmission state of the first normal base station and the actual transmission state of the interference normal base station, performing user scheduling of the first normal base station in accordance with the third CQIs and performing user scheduling of each of the low-power nodes covered by the first normal base station in accordance with the fourth CQIs.

The step E2 further comprises performing calculation and updating of the third CQIs and the fourth CQIs to obtain actual CQIs corresponding to the actual transmission state of the first normal base station and the actual transmission state of the interference normal base station.

Yet another aspect of the present invention is a method for coordinating inter-cell interference in a heterogeneous network (HetNet), comprising the steps of:

a step A3 of forming M transmission points (M is greater than 1) into a coordinated group, each of the M transmission points including one or a plurality of normal base stations and low-power nodes covered by the respective normal base stations;

a step B3 of combining mute/non-mute states of bandwidths of the M transmission points to obtain a plurality of states of the coordinated group;

a step C3 of a user of each of the transmission points in the coordinated group feeding at least one channel quality indicator (CQI) corresponding to the states of the coordinated group, back to the transmission point;

a step D3 of making capacity estimation of the coordinated group based on the fed-back CQI to obtain a plurality of system capacities corresponding to the respective states of the coordinated group; and a step E3 of setting the mute/non-mute states of the bandwidths of the M transmission points in accordance with a state of the coordinated group corresponding to an optimal system capacity so as to perform data transmission.

The states of the coordinated group in the step B3 include any combination of the mute/non-mute states of the M transmission points, and in the step C3, a user of each of the transmission points decides M CQIs and each of the CQIs is related to signal strength of the corresponding transmission point and interference strength outside the coordinated group.

The states of the coordinated group in the step B3 are decided by a number of mute transmission points and the number of mute transmission points corresponding to an i-th state of the coordinated group is i (i=0, 1, ..., M−1), and in the step C3, the user of each of the transmission points decides M CQIs and each of the CQIs is related to signal strength of the transmission point to which the user belongs, signal strength of another non-mute transmission point in the i-th state of the coordinated group and interference strength outside the coordinated group.

Each of the states of the coordinated group in the step B3 corresponds to one of selections by, once a number $N_{close}$ of mute transmission points is decided, selecting $N_{close}$ transmission points arbitrarily from the M transmission points and making the $N_{close}$ transmission points mute, a value of $N_{close}$ being any of 1, ..., M−1, and in the step C3, the user of each of the transmission points decides M CQIs, each of the CQIs being related to signal strength of the transmission point to which the user belongs, signal strength of another non-mute transmission point in the corresponding state of the coordinated group signal, and interference strength outside the coordinated group.

Advantageous Effects of Invention

In the method and heterogeneous network provided in the embodiments of the present invention, the mute/non-mute states of the plural normal base stations are decided in a consolidated manner by using the coordinated group, thereby improving system average throughputs and edge throughputs effectively. Further, the number of CQIs fed back from a user is increased and an actual amount of feedback information is controlled, thereby improving the system average throughputs and/or edge throughputs to a greater degree. Particularly, if each user accesses a transmission point and the service area of a low-power node is extended by adopting an offset, the method as provided by each embodiment of the present invention has greater performance gains.

DESCRIPTION OF EMBODIMENTS

Figure 1A:
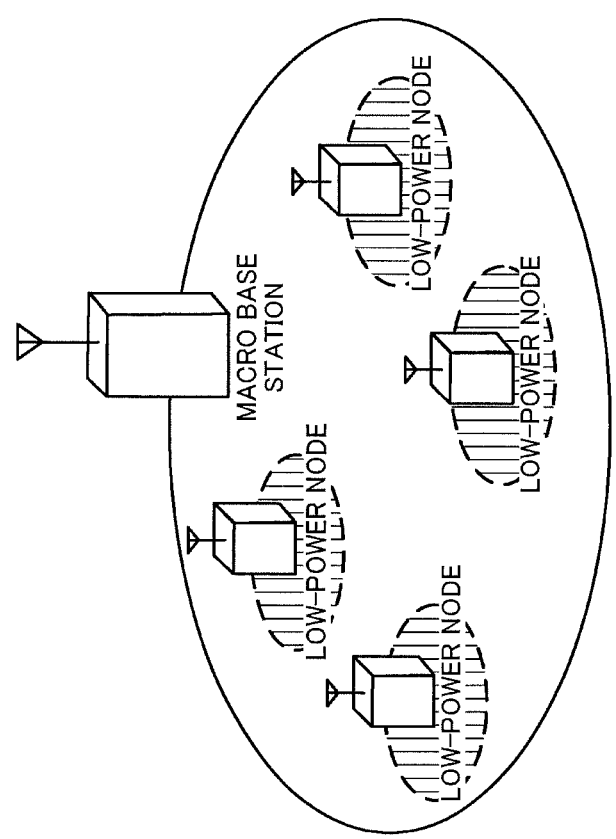
FIG. 1a is a diagram illustrating cover areas of a macro base station and low-power nodes in the case of macro base station without transmission.
Figure 1B:
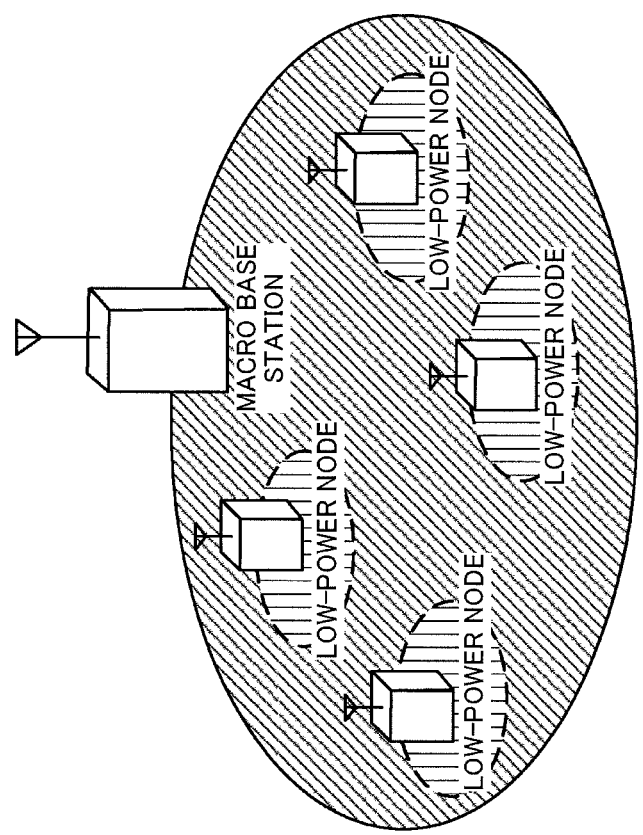
FIG. 1b is a diagram illustrating cover areas of a macro base station and low-power nodes in the case of macro base station with transmission.
Figure 2:
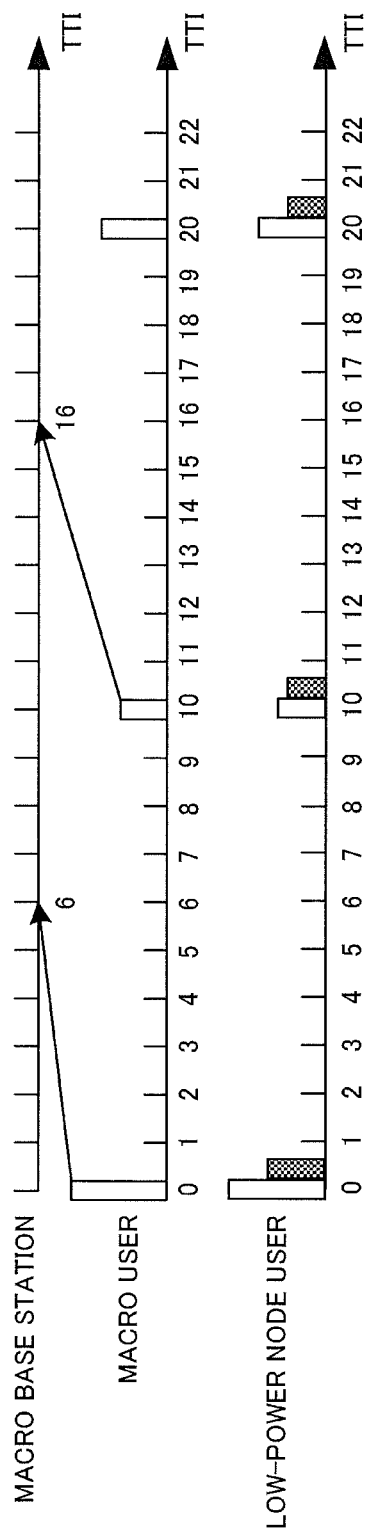
FIG. 2 is a diagram illustrating feedback of CQIs from a user to a transmission point.

In order to further clarify an objective, solving means and merits of the present invention, the present invention will be described in detail below, with reference to the drawings and by way of embodiments.

In order to solve the problem of unpredictable change in interference due to independent decision of mute/non-mute state by each normal base station, according to one embodiment of the present invention, there is provided a consolidated mute/non-mute decision method over normal base stations for forming some neighbor normal base stations into a coordinated group and making consolidated decision of mute or non-mute at each transmission time.

Specifically, the present invention provides a method for coordinating inter-cell coordination in a heterogeneous network. The method comprises:

a step A of forming M normal base stations (M is greater than 1) and low-power nodes within coverage of each of the normal base stations in a heterogeneous network into a coordinated group;

a step B of combining mute/non-mute states of bandwidths of the M normal base stations to obtain a plurality of states of the coordinated group;

a step C of each user of each of the normal base stations in the coordinated group feeding at least one first channel quality indicator (CQI) corresponding to the states of the coordinated group, back to the normal base station;

a step D of each user of each of the low-power nodes within coverage of the normal base stations in the coordinated group feeding one or more second CQIs corresponding to the states of the coordinated group, back to the low-power node;

a step E of performing capacity estimation of the coordinated group based on the at least one first CQI and the one or more second CQIs to obtain a plurality of system capacities corresponding to the respective states of the coordinated group; and a step F of setting up the mute/non-mute states of bandwidths of the M normal base stations in accordance with a state of the coordinated group corresponding to an optimal system capacity so as to perform data transmission.

In the step B, it is possible to decide a plurality of states of the coordinated group in accordance with accrual situations. For example, these plural states may include all combinations of mute/non-mute states of the M normal base stations or some states selected from the above-mentioned combinations. Or, they may include only two states, one state being composed of all non-mute states and the other being composed of all mute states. In the step C, each of the normal base stations in the coordinated group receives the first CQI fed back from each user of the normal base station by executing processing. In the step D, likewise, each low-power node in the coordinated group receives the second CQI fed back from each user of the low-power node by executing processing. In the step E, the feedback CQIs are subjected to calculation and updating, and updated CQIs are used as a basis to be able to estimate system capacities of the whole coordinated group. This step includes step-by-step calculation. For example, first, a capacity of each low-power node is estimated about plural states and then, system capacities of all low-power nodes within coverage of a certain normal base station are used as a basis to estimate system capacities of the normal base station about plural states. Finally, system capacities of all normal base stations in the coordinated group are used as a basis to estimate system capacities of the coordinated group about the plural states. In a specific embodiment, the system capacities may be throughputs estimated with the CQIs or may be such as considering with both of throughputs and fairness.

For example, for some macro base station, there is no problem of unpredictability of surrounding interference if neighbor macro base stations within the same coordinated group perform mute/non-mute together with the macro base station. On the other hand, if a low-power node user feeds back CQIs of the two states, one being such that all macro base stations in the coordinated group are non-mute and the other being such that all macro base stations in the coordinated group are mute, it is possible to, in scheduling, select an appropriate CQI based on the actual consolidated decision of mute/non-mute state and thereby to select an MCS level. With this structure, the selected MCS level is matched with a channel state in actual transmission, thereby to reduce an error bit rate and to improve the system throughputs.

Besides, for a macro base station in the coordinated group, possible combinations of mute/non-mute states include not only the combination of all mute states and the combination of all non-mute states, but also, various combinations such as a combination composed of non-mute states of some macro base stations and mute states of some macro base stations. Each of the combinations of the mute/non-mute states is called one state of the coordinated group. In order to select an optimal state from many states, according to a specific embodiment of the present invention, it is required to feed back CQIs of plural states from each user. For example, when the coordinated group includes M macro base stations, one or a plurality of pico base stations are located within coverage of each of the macro base stations, and each CQI (called a first CQI) fed back from a macro user is related to signal strength of each macro base station and interference strength outside the coordinated group. For example, the i-th first CQI fed back from the macro user can be expressed by $CQIm_i$=function ($P_j$, ICI+n). In the equation, $P_j$ (j=1, 2, ..., M) represents signal strength of the j-th macro base station. Specifically, the interference strength outside the coordinated group may be actual interference strength measured by the macro user at the CQI feedback time. In this case, the macro user decides the interference strength based on actual mute/non-mute state of each of one or plural macro base stations outside the coordinated group. For example, reference signal strength of each macro base station in the mute state is not reflected in interference strength. The interference strength outside the coordinated group may be estimated interference strength measured by each macro user (for example, interference strength obtained on the assumption that each of one or more macro base stations outside the coordinated group is in the non-mute state). In this case, even reference signal strength of a macro base station actually in the mute state is reflected in the interference strength. As a matter to be explained, different CQIs fed back from macro users and signal strength and/or interference strength need not to have same relationship (see $CQIm_1$, $CQIm_2$, $CQIm_3$, in the step 402). Each CQI (called a second CQI) fed back from a pico base station user is related to signal strength of a serving pico base station of the user, signal strength of each macro base station within the coordinated group and the interference strength outside the coordinated group. As a matter to be explained, the interference strength outside the coordinated group may be actual interference strength measured by a pico base station user at the CQI feedback time or estimated interference strength obtained by the pico base station user. In one specific embodiment, the i-th second CQI fed back from the pico base station user can be expressed by $CQIp_i$=function $(P_p, P_j, ICI+n)$. In the equation, $P_p$ represents signal strength of the serving pico base station and $P_j$ (j=0, 1, 2, . . . , M) represents signal strength of the j-th macro base station. As a matter to be explained, $P_p$ and $P_j$ may appear repeatedly in plural second CQIs fed back from the pico base station user and may be appear one of the second CQIs, however, they appear in all second CQIs fed back from the pico base station user at least once. After receiving the above-mentioned CQIs (including first CQIs and/or second CQIs), a corresponding transmission point performs calculation and updating by a fixed method and obtains CQIs of all possible states of the coordinated group. Then, it compares sums of capacities of all macro base stations in the coordinated group between states, select a state corresponding to the greatest sum of capacities, and performs actual transmission. In this way, the sum of capacities of all macro base stations in the coordinated group becomes optimal even per TTI. Accordingly, it becomes possible to greatly improve the system capacities of the dynamic eICIC.

Specifically, assuming that three macro base stations are included in the coordinated group, there are eight possible states of the coordinated group. In this case, each macro user feeds back three first CQIs and each low-power node user feeds back four second CQIs. After receiving the CQIs mentioned above, a macro base station can obtains CQIs of four states of the macro user and CQIs of eight states of the low-power node user by calculation. Then, the macro base station estimates a capacity of each corresponding state based on the CQI of the state, and finally, selects a state of optimal capacity from the eight states so that the three macro base stations in the coordinated group perform actual transmission in accordance with the state.

As a matter to be explained, in the above-mentioned embodiment, the macro users and low-power node users both increase the amount of feedback information. Accordingly, in order to maintain an overhead of the feedback of each user at a normal level or relatively low level, a fixed mechanism is further adopted to reduce the actual amount of feedback information. For example, different feedback cycles may be adopted to CQIs in different states, or a difference between a required CQI and some reference CQI may be sent as feedback. In realizing multi CQI feedback by adopting different feedback cycles, CQIs of different states are treated distinctively, but the same feedback cycle is not adopted. Specifically, the CQI feedback of a CQI representative of desired signal strength is smaller than the feedback cycle of a CQI representative of interference signal strength.

In an embodiment of the present invention, it is possible to obtain a plurality of states of the coordinated group by combining mute/non-mute states of bandwidths of M normal base stations. In one specific embodiment, the mute/non-mute state of the bandwidth of each normal base station is a mute/non-mute state of the whole band (wideband) of the normal base station (that is, the mute/non-mute state of the normal base station). In another specific embodiment, the mute/non-mute state of the bandwidth of each normal base station is a mute/non-mute state of each subband or subband group of the normal base station, and mute/non-mute states of subbands of normal base stations are combined to obtain plural states of the coordinate group per subband. Here, each subband group includes a plurality of subbands.

Figure 3:
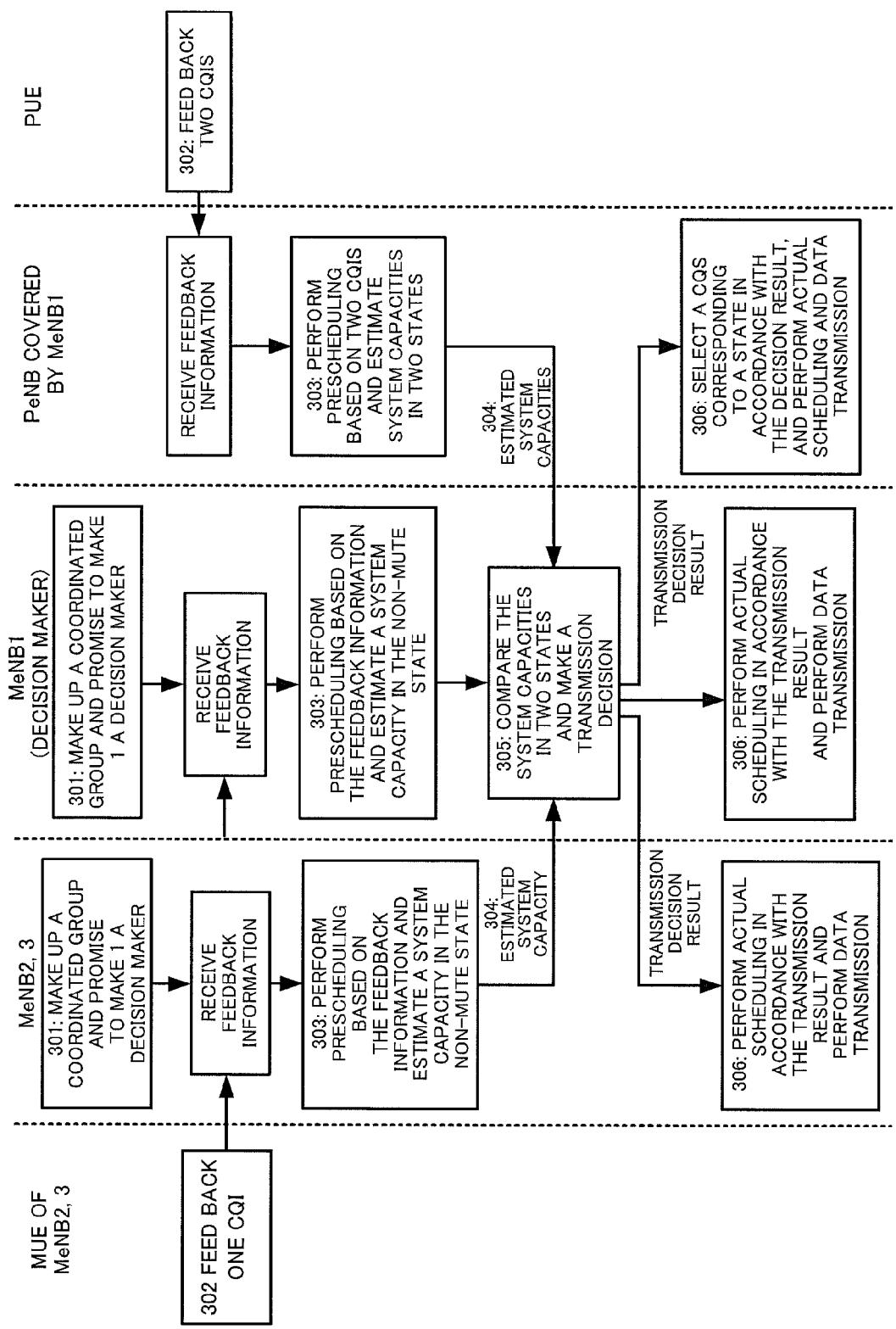
FIG. 3 is a diagram illustrating the flow of a method for making consolidated decision of mute/non-mute state over plural macro base stations according to an embodiment of the present invention.
Figure 4:
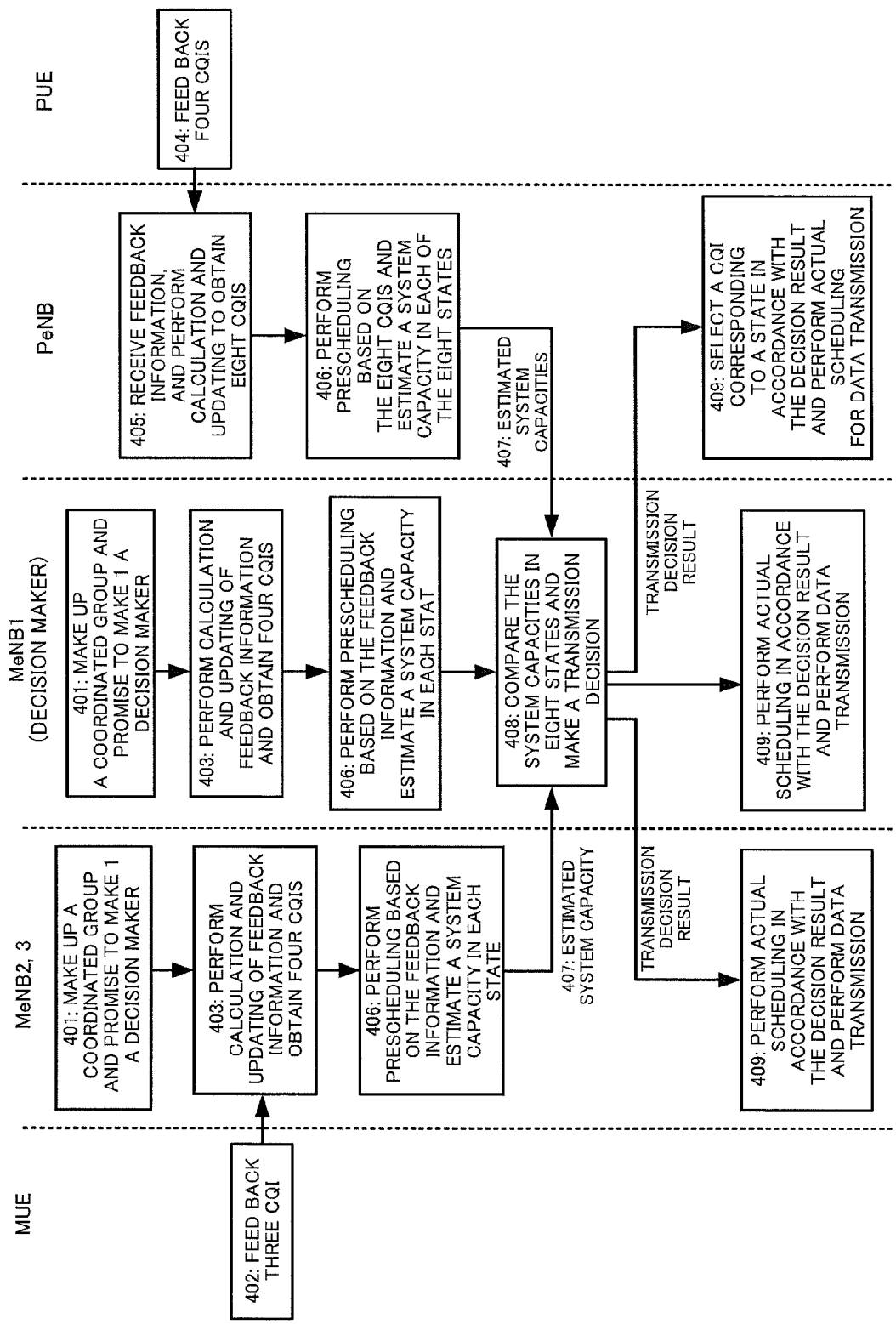
FIG. 4 is a diagram illustrating the flow of a method for making consolidated decision of mute/non-mute state over plural macro base stations according to another embodiment of the present invention.

With reference to FIGS. 3 and 4, description is made about a method for coordinating inter-cell interference by way of example of the mute/non-mute state over a whole band.

FIG. 3 illustrates a flow of the method for making consolidated decision of mute/non-mute state over plural macro base stations according to one embodiment of the present invention (this method is also referred to as "Method 1 of the present invention"). This method includes the following steps.

In the step 301, three macro base stations (MeNBs) located in the same area are formed into a coordinated group, and one of them is determined to be a decision macro base station (decision maker).

Needless to say, each of the macro base stations in the coordinated group can cover one or more pico base stations (PeNBs). Each of these macro base stations and pico base stations as transmission points has its own users. A user of a certain macro base station is called a macro user (MUE), the macro base station becomes a serving macro base station for the macro user. When a user of a certain pico base station is called a pico base station user (PUE), the pico base station becomes a serving pico base station for the pico base station user.

In the step 302, a user decides a CQI and feeds the CQI back to a transmission point.

Specifically, each macro user feeds one CQI (called a first CQI) back to a serving macro base station of the macro user, and the CQI corresponds to a CQI of the non-mute state of the three macro base stations (for example, $CQIm_1=P_1/(P_2+P_3+ICI+n)$). Each pico base station user feeds two CQIs (called second CQIs) back to a serving pico base station of the pico base station user, and these two CQIs correspond to two states, one of which is such that the three macro base stations in the coordinated group are all non-mute and the other is such that the three macro base stations are all mute (for example, for the all non-mute case, $CQIp_1=P_p/(P_1+P_2+P_3+ICI+n)$, and for the all mute case, $CQIp_2=P_p/(ICI+n)$). Here, ICI is a sum of interference of the other pico base stations and macro base stations outside the coordinated group. This ICI may be interference measured with the actual mute/non-mute state of the macro base stations outside the coordinated group or interference measured assuming that all the macro base station outside the coordinated group are in the non-mute state.

In the step 303, each macro base station performs prescheduling based on information fed back from a macro user of the own station, and estimate a system capacity of the macro base station in the non-mute state. In the same manner, each pico base station performs prescheduling based on two CQIs fed back from a pico base station user of the own station, and estimates a sum of capacities of the pico base station user in each of the two states of the three macro base stations in the coordinated group, one of the two states being such that all of the macro base stations are non-mute and the other being such that all of the macro base stations are mute.

As a matter to be explained, each transmission point performs capacity estimation based on CQIs fed back from users of the own station, which can be understood with reference to the conventional art, and its explanation is omitted here.

In the step 304, all the pico base stations and the other two macro base stations in the coordinated group transmit estimated system capacities to the decision macro base station.

In the step 305, the decision macro base station calculates and compares capacities of the entire system about the two states, one of which is such that the three macro base stations are all non-mute and the other is such that the three macro base stations are all mute, and makes transmission decision. Then, it sets actual transmission states of all the macro base stations in the coordinated group to be a state of higher capacity, and notifies all the pico base stations and the other two macro base stations in the coordinated group of the transmission decision result.

In the step 306, the other two macro base stations perform data transmission in accordance with the transmission decision result, and likewise, all the pico base stations in the coordinated group perform scheduling and data transmission in accordance with the transmission decision result.

In another embodiment of the present invention, if the three macro base stations are all remote radio heads (RRHs) and share one control section, the flow illustrated in FIG. 3 is changed as follows. That is, in the step 301, when the three RRHs are formed into a coordinated group, there is no need to select one of the RRHs as a decision macro base station, and the required transmission decision function is executed by the control section. In the steps 303 and 304, each of the three RRHs transmits all received CQIs to the control section. The control section performs prescheduling on all of the macro users served by the three RRHs and estimates a sum of capacities of the macro users in the all non-mute state of the three RRHs. In this case, there is no need to change the processing executed by the pica base stations.

FIG. 4 illustrates a flow of a method for making consolidated decision of mute/non-mute state over a plurality of macro base stations according to another embodiment of the present invention (called Method 2 of the present invention). This method includes the following steps. As a matter to be explained, in this embodiment, the mechanism for a user to feed back CQIs is not the same as that in FIG. 3. In this case, each macro user has to feed back three CQIs and each low-power node user has to feed back four CQIs.

In the step 401, three macro base stations located in the same area are formed into a coordinated group and one of them is selected as a decision macro base station.

Like in the step 301 of FIG. 3, if all of the three macro base stations are RRHs and share one control section, it is not necessary to select a decision macro base station.

In the step 402, each macro user feeds three first CQIs back to the serving macro base station of the macro user.

In a specific embodiment of the present invention, the three first CQIs fed back from each macro user in the step 402 are $CQIm_1=P_1/(ICI+n)$, $CQIm_2=P_2/(ICI+n)$, and $CQIm_3=P_3/(ICI+n)$. Here, $P_j$ (j=1, 2, 3) represents signal strength received from the j-th macro base station in the coordinated group by the macro user, ICI represents interference strength outside the coordinated group or interference strength of the other macro base stations other than the three macro base stations in the coordinated group and all pico base stations, and n represents a heat noise. Specifically, ICI may be actual interference strength determined by the macro user based on actual mute/non-mute state of the macro base stations outside the coordinated group or may be estimated interference strength measured assuming that all the macro base stations outside the coordinated group are in the non-mute state.

In a specific embodiment of the present invention, each macro user feeds three first CQIs back to the serving macro base station of the macro user in the step 402. These three first CQIs are $CQIm_1=P_1/(ICI+n)$, $CQIm_2=P_1/(P_2+ICI+n)$, and $CQIm_3=P_1/(P_3+ICI+n)$. Here, $P_j$ (j=1, 2, 3) represents signal strength received from the j-th macro base station in the coordinated group by the macro user, ICI represents interference strength of the other macro base stations other than the three macro base stations in the coordinated group and all pico base stations, and n represents a heat noise.

In the step 403, after receiving three first CQIs fed back from each macro user, the macro base station performs calculation and updating and obtains CQIs of four states.

Figure 5:
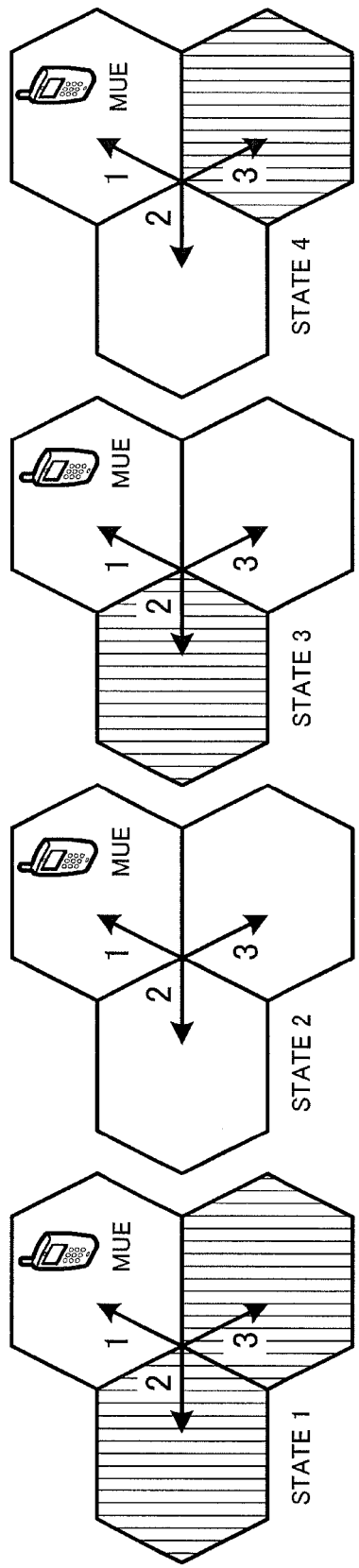
FIG. 5 is a diagram illustrating four possible combinations of mute/non-mute states of three macro base stations in one specific application scenario of the present invention.

In one specific embodiment of the present invention, description is made by way of example of a macro user in the first macro base station. For this macro user, the CQIs for the four states are as follows: 1) when the second and third macro base stations are mute, $CQI=CQIm_1$, 2) when the second and third macro base stations are non-mute, $CQI=CQIm_1/(CQIm_3+CQIm_2+1)$, 3) when the second macro base station is mute and the third macro base station is non-mute, $CQI=CQIm_1/(CQIm_3+1)$, and 4) when the second macro base station is non-mute and the third macro base station is mute, $CQI=CQIm_1/(CQIm_2+1)$. These four states are as illustrated in FIG. 5. In the figure, the unfilled areas indicate that macro base stations in these areas are non-mute and the areas filled with vertical lines indicate that macro base stations in these areas are mute.

In another specific embodiment of the present invention, after receiving three first CQIs fed back from each macro user, the macro base station performs calculation and updating to obtain CQIs of four states in the step 403. Taken an example of a macro user in the first macro base station, CQIs corresponding to the four states for the macro user are as follows: 1) when the second and third macro base stations are mute, $CQI=CQIm_1$, 2) when the second and third macro base stations are non-mute, $CQI=1/(1/CQIm_2+1/CQIm_3-1/CQIm_1)$, 3) when the second macro base station is mute and the third macro base station is non-mute, $CQI=CQIm_3$, and 4) when the second macro base station is non-mute and the third macro base station is mute, $CQI=CQIm_2$.

In the step 404, each pica base station user feeds four second CQIs back to the serving pica base station of the pica base station user.

Specifically, these four second CQIs are $CQIp_1=P_1/(ICI+n)$, $CQIp_2=P_2/(ICI+n)$, $CQIp_3=P_3/(ICI+n)$, and $CQIp_0=P_p/(ICI+n)$. Here, $P_j$ (j=1, 2, 3) represents signal strength received from the j-th macro base station in the coordinated group by the pica base station user, $P_p$ represents signal strength received from a serving pica base station by the pica base station user, ICI represents interference strength outside the coordinated group or interference strength of the other macro base stations other than the three macro base stations in the coordinated group and pica base stations other than the serving pica base station, and n represents a heat noise. Specifically, ICI may be actual interference strength determined by the pica base station user based on actual mute/non-mute state of the macro base stations outside the coordinated group or may be estimated interference strength measured assuming that all the macro base stations outside the coordinated group are in the non-mute state.

In the step 405, receiving the four second CQIs fed back from each pica base station user, the pica base station performs calculation and updating and obtains CQIs of eight states.

Figure 6:
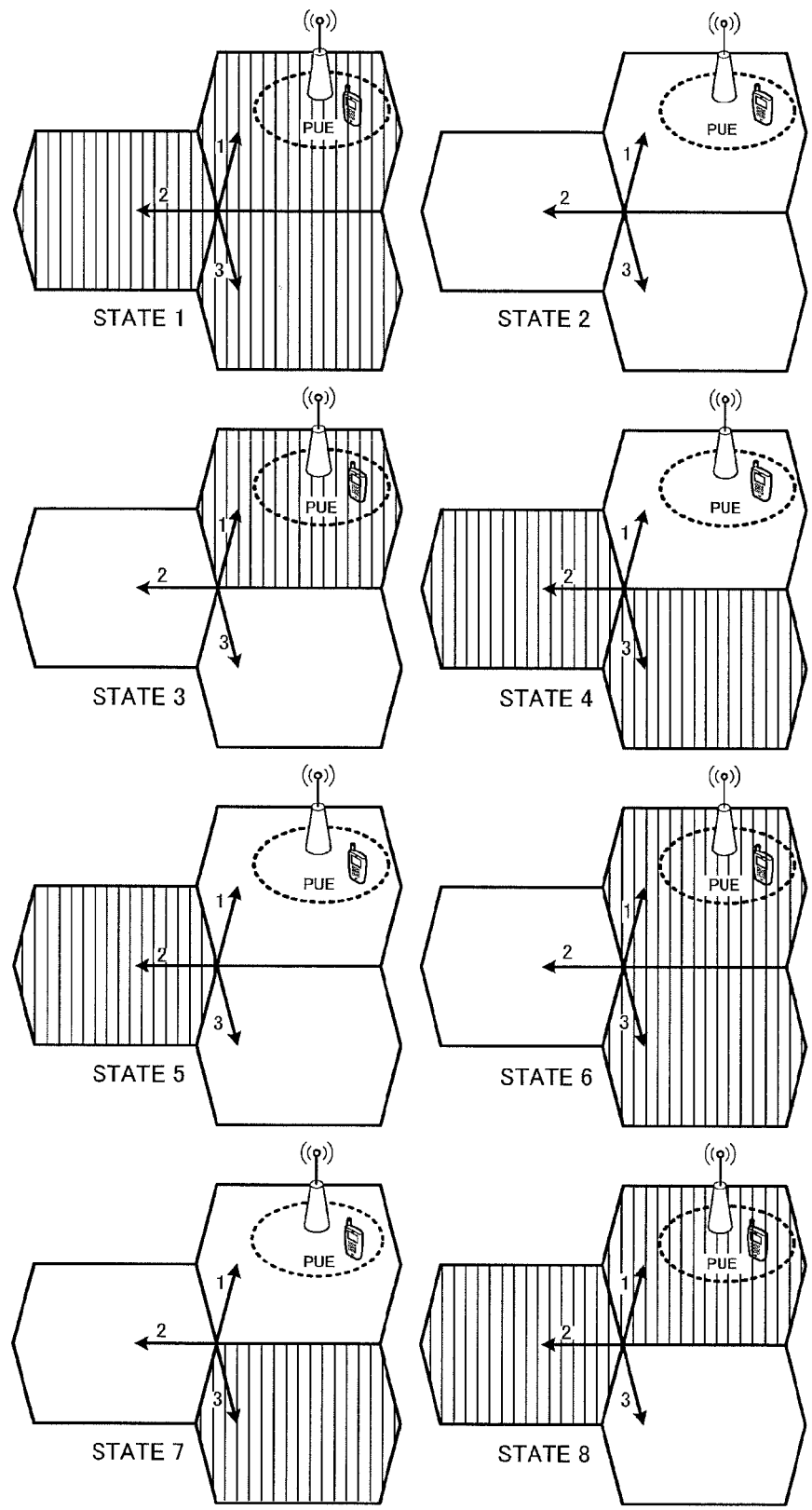
FIG. 6 is a diagram illustrating eight possible combinations of mute/non-mute states of three macro base stations in one specific application scenario of the present invention.

Taken an example of a pico base station user under control of a pico base station in the first macro base station, for the pico base station user, CQIs corresponding to eight states are as follows: 1) when the first, second and third macro base stations are all mute, $CQI=CQIp_0$, 2) when the first, second and third macro base stations are all non-mute, $CQI=CQIp_0/(CQIp_3+CQIp_2+CQIp_1+1)$, 3) when the first macro base station is mute and the second and third macro base stations are non-mute, $CQI=CQIp_0/(CQIp_3+CQIp_2+1)$, 4) when the first macro base station is non-mute and the second and third macro base stations are mute, $CQI=CQIp_0/(CQIp_1+1)$, 5) when the second macro base station is mute and the first and third macro base stations are non-mute, $CQI=CQIp_0/(CQIp_3+CQIp_1+1)$, 6) when the second macro base station is non-mute and the first and third macro base stations are mute, $CQI=CQIp_0/(CQIp_2+1)$, 7) when the third macro base station is mute and the first and second macro base stations are non-mute, $CQI=CQIp_0/(CQIp_2+CQIp_1+1)$, and 8) when the third macro base station is non-mute and the first and second macro base stations are mute, $CQI=CQIp_0/(CQIp_3+1)$. These eight states are as illustrated in FIG. 6. Here, the unfilled areas indicate that macro base stations in these areas are non-mute and the areas filled with vertical lines indicate that macro base stations in these areas are mute.

In the step 406, each macro base station performs prescheduling based on updated CQI information of four states, and estimates a sum of capacities of macro users in each of the states. Each pico base station performs prescheduling based on updated CQI information of eight states and estimates a sum of capacities of the pico base station user in each of the states.

In the step 407, all the pico base stations and the other two macro base stations in the coordinated group transmit estimated system capacities to the decision macro base station.

In the step 408, the decision macro base station calculates the system capacities of the three macro base stations in the coordinated group about the eight states, makes transmission decision and sets the actual transmission states of the three macro base stations in the coordinated group in accordance with a state of higher capacity. Then, it transmits the transmission decision result to all the pico base station and the other two macro base stations in the coordinated group.

In the step 409, the other two macro base stations perform data transmission in accordance with the transmission decision result and all the pico base stations in the coordinated group perform scheduling and data transmission in accordance with the transmission decision result.

Specifically, each pico base station performs scheduling in accordance with a CQI corresponding to the actually decided state of the coordinated group. For example, as to the actual transmission state, when the third macro base station is non-mute and the first and second macro base stations are mute, the pico base station does not perform scheduling in accordance with the received feedback CQI but performs scheduling with a value of $CQI=CQIp_0/(CQIp_3+n)$.

As a matter to be explained, in the above-described flow, the first CQIs and second CQIs are both CQIs fed back from each user and are named differently merely so as to discriminate between CQIs fed back from a macro user and CQIs fed back from a pico base station user.

In another embodiment of the present invention, in order to reduce an amount of feedback information from users statistically, the following change may be made to the steps 402 to 405 in FIG. 4 (also called Improvement to Method 2 of the present invention).

Specifically, in the step 402, each macro user feeds only one CQI back to a serving macro base station of the macro user at each CQI feedback time. This one CQI is one of the three first CQIs $CQIm_1=P_1/(ICI+n)$, $CQIm_2=P_2/(ICI+n)$, and $CQIm_3=P_3/(ICI+n)$. Here, $P_j$ (j=1, 2, 3) represents signal strength received from the j-th macro base station in the coordinated group by the macro user, ICI represents interference strength of the other macro base stations other than the three macro base stations and all pico base stations in the coordinated group, and n represents a heat noise. As a matter to be explained, these three first CQIs have different feedback cycles. For example, a CQI feedback cycle corresponding to the serving macro base station is twice the feedback time interval, the CQI feedback cycle of the other two first CQIs is three times the feedback time interval. Accordingly, in the step 403, after receiving one CQI fed back from each macro user, the macro base station picks up CQIs of previously received latest other two cases, and uses these three CQIs as a basis to perform analogue calculation and updating, thereby to obtain CQIs for the four cases.

In the step 404, each pico base station user feeds two CQIs back to a serving pico base station of the pica base station user. One of the CQIs is $CQIp_0=P_p/(ICI+n)$, and the other CQI is one of the three second CQIs of $CQIp_1=P_1/(ICI+n)$, $CQIp_2=P_2/(ICI+n)$, $CQIp_3=P_3/(ICI+n)$. Here, $P_j$ (j=1, 2, 3) represents signal strength received from the j-th macro base station in the coordinated group by the pico base station user, $P_p$ represents signal strength received from the serving pico base station by the pico base station user, ICI represents interference strength of the macro base stations and pico base stations other than the three macro base stations and the serving pico base station in the coordinated group, and n represents a heat noise. The feedback cycle of these three second CQIs is three times the feedback time interval. Accordingly, in the step 405, after receiving two CQIs fed back from each pico base station user, the pico base station picks up CQIs of previously received latest other two cases, and uses these four CQIs as a basis to perform analogue calculation and updating, thereby to obtain CQIs for the eight cases.

Figure 7:
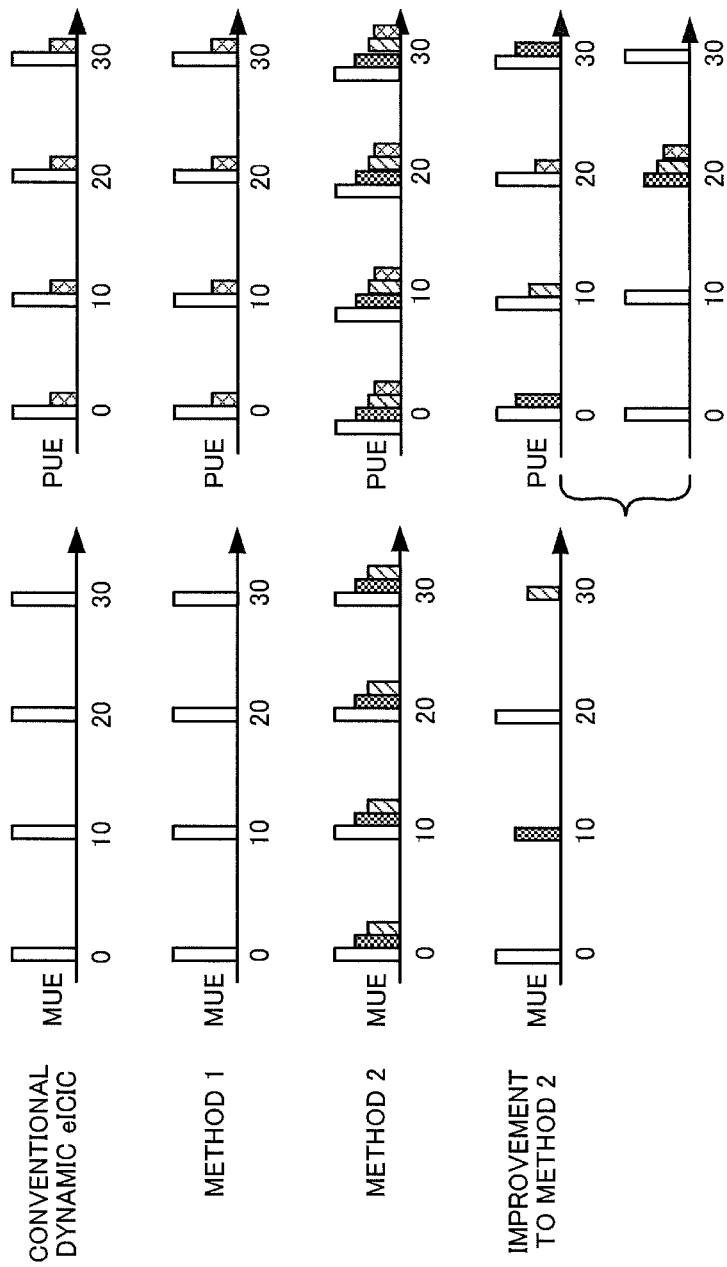
FIG. 7 is a diagram illustrating feedback of CQIs from a user to a transmission point according to one embodiment of the present invention.

Specifically, FIG. 7 illustrates differences in user's CQI feedback between the conventional dynamic eICIC technique, the method 1 of the present invention, the method 2 of the present invention and the improvement to the method 2 of the present invention. As to the improvement to the method 2 of the present invention, FIG. 7 illustrates only some of the methods for decreasing the amount of feedback information. There are many other methods (for example, a method for changing the feedback cycle for different CQIs, or a method for feeding one CQI and a difference between the CQI and another CQI, etc.). These methods are all effective to achieve the objective of reducing feedback overhead of each user statistically.

Theoretically, for a coordinated group composed of M macro base stations (M is an integer greater than 1), according to the method 2 of the present invention, the number of CQIs that need to be fed back is as follows. That is, each macro user feeds back M CQIs, and each base station user feeds back M+1 CQIs. As is clear from this, as the coordinated group becomes larger, the number of CQIs that need to be fed back also becomes much larger. Other than the methods for reducing the feedback information amount proposed as the improvement to the method 2 of the present invention, if the number of macro base stations in the coordinated group is relatively large, it may be possible to eliminate the need to feed back relatively-small CQIs or unimportant CQIs thereby to achieve the objective of reducing the feedback information amount. For example, the number of CQIs fed back from each macro user is made smaller than M. In conjunction with this, in scanning and selecting the state, a state of generally smaller CQI is abandoned directly and removed from capacity estimation and comparison. Needless to say, a macro user may feed back $2^{M-1}$ CQIs and a pico base station user may feed back $2^M$ CQIs. In this case, the process of calculation and updating in the steps 403 and 405 may not be executed.

As a matter to be explained, in the flow illustrated in FIG. 4, the steps 402 and 404 may be executed simultaneously and the steps 403 and 405 may be executed simultaneously. Besides, the equations for CQI feedback and CQI updating provided in the steps 402 to 405 are merely examples, and may be modified variously in actual application as long as the decision macro base station or the control section can obtain CQIs of each state of the coordinated group.

Figure 8A:
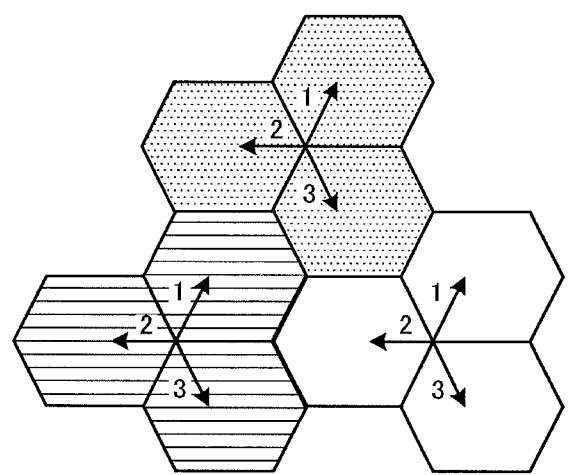
FIG. 8a is a diagram illustrating a structure of a coordinated group according to one specific application scenario of the present invention.
Figure 8B:
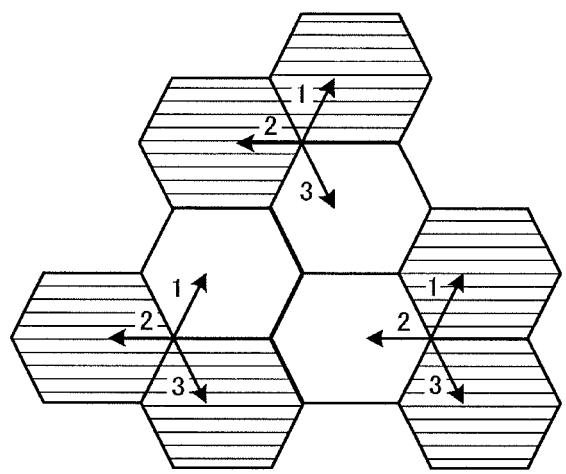
FIG. 8b is a diagram illustrating a structure of a coordinated group according to another specific application scenario of the present invention.

In addition, each coordinated group composed of three macro base stations located in the same area in the steps 301 and 401 is as illustrated in FIG. 8a. For example, the locations of the macro base stations 1, 2 and 3 are the same and at the center (starting point of each arrow in FIG. 8a), but these three macro base stations have different antenna directions and different service areas. These three macro base stations are formed into one coordinated group. Needless to say, every three co-located normal base stations form a corresponding coordinated group. In a heterogeneous network, a plurality of coordinated groups may be provided. Another configuration of a coordinate group is illustrated in FIG. 8b. Three macro base stations in unfilled areas can form a coordinated group, but, they are located differently.

Figure 9:
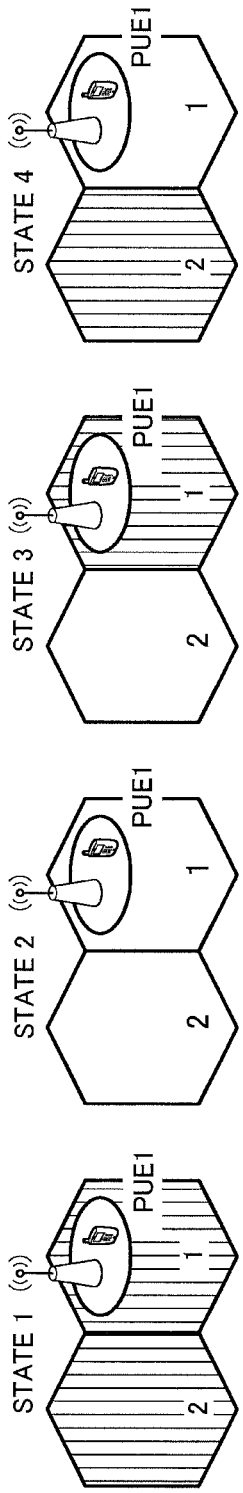
FIG. 9 is a diagram illustrating four possible combinations of mute/non-mute states of two macro base stations according to one specific application scenario of the present invention.

Here, a coordinated group made of two macro base stations is taken as example. A macro base station 1 covers a pico base station A and a pico base station B, and a macro base station 2 covers a pico base station C and a pico base station D. As illustrated in FIG. 9, the coordinated group has at most four states. These four states can be obtained by combining mute/non-mute states of the two macro base stations. The state 1 is such that the macro base station 1 is mute and the macro base station 2 is mute, the state 2 is such that the macro base station 1 is non-mute and the macro base station 2 is non-mute, the state 3 is such that the macro base station 1 is mute and the macro base station 2 is non-mute, and the state 4 is such that the macro base station 1 is non-mute and the macro base station 2 is mute.

The process of selecting the macro base station as a decision macro base station is analogue to the flow illustrated in FIG. 4. That is, first, the macro base station 2 receives two first CQIs fed back from a macro user of the own station, performs updating and obtains CQIs of the states 2 and 3 (that is, where the macro base station 2 is non-mute). In the same manner, the pico base station C receives three second CQIs fed back from a pico base station user of the own station, performs updating and obtains CQIs of the states 1 to 4. At this time, the pico base station C may estimate system capacities of the pico base station C in the states 1 to 4 and provide them to the macro base station 2 or it may provide the updated CQIs of the states 1 to 4 to the macro base station 2 directly. The pico base station D can perform processing similar to that of the pico base station C. Then, the macro base station 2 utilizes CQIs of the states 2 and 3 updated in the own station, and further utilizes CQIs of the states 1 to 4 updated in the pico base station C and CQIs of the states 1 to 4 updated in the pico base station D to estimate system capacities of the macro base station 2 in the states 1 to 4 and provides the system capacities to the macro base station 1. Needless to say, the macro base station 2 may utilize CQIs of the states 2 and 3 updated in the own station and also utilize system capacities of the pico base station C in the states 1 to 4 and system capacities of the pico base station D in the states 1 to 4 thereby to estimate system capacities of the macro base station 1 in the states 1 to 4. Use of such a method can contribute to reduction in the amount of information exchange.

The macro base station 1 performs similar processing to that of the macro base station 2. As a difference point, the macro base station 1 receives two first CQIs fed back from a macro user of the own station and then, performs updating to obtain CQIs of the states 2 and 4 (that is, where the macro base station 1 is non-mute). The pico base stations A and B perform similar processing to that of the pico base station C. In this way, the macro base station 1 can estimate system capacities of the states 1 to 4 of the macro base station 1.

Further, the macro base station 1 estimates, as a decision macro base station, system capacities of the whole coordinated group in the states 1 to 4 based on the system capacities of the macro base station 1 in the states 1 to 4 and the system capacities of the macro base station 2 in the states 1 to 4. Then, the macro base station 1 selects an optimal system capacity from these four system capacities and sets the mute/non-mute states of the own station and the macro base station 2. For example, when the system capacity corresponding to the state 2 is an optimal one, the macro base station 1 is set to non-mute and the macro base station 2 is set to non-mute, and then, data transmission is performed. Needless to say, in scanning the state, a part of the four states may be considered. For example, comparison may be made about system capacities of three states.

If the macro base station 1 and the macro base station 2 share one control section, the macro base station 1 provides system capacities of the own station in the states 1 to 4 to the control section and the macro base station 2 also provides system capacities of the own station in the states 1 to 4 to the control section. The control section estimates system capacities of the whole coordinated group in the states 1 to 4, selects an optimal system capacity from these four system capacities and sets the mute/non-mute states of the macro base station 1 and the macro base station 2.

Figure 10:
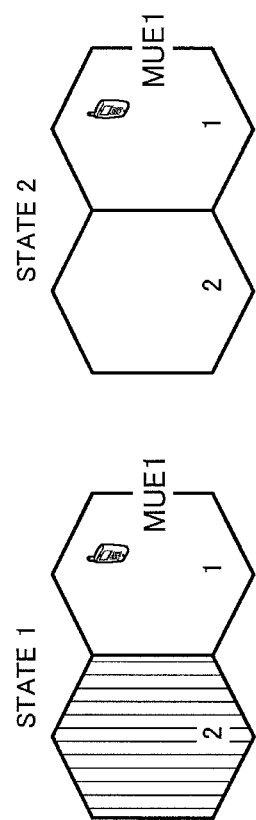
FIG. 10 is a diagram illustrating two possible combinations of mute/non-mute states of two macro base stations according to one specific application scenario of the present invention.

In a specific embodiment of the present invention, two first CQIs fed back from a macro user are $CQIm_1=P_1/(ICI+n)$ and $CQIm_2=P_2/(ICI+n)$. In updating the CQIs, taken as an example of a macro user in the macro base station 1, updated CQIs corresponding to the following two states (see FIG. 10) are as follows: 1) when the second macro base station is mute, $CQI=CQIm_1$, and 2) when the second macro base station is non-mute, $CQI=CQIm_1/(CQIm_2+1)$.

In another specific embodiment of the present invention, two first CQIs fed back from a macro user are $CQIm_1=P_1/(ICI+n)$ and $CQIm_2=P_1/(P_2+ICI+n)$. In this case, after receiving two first CQIs fed back from each macro user, the macro base station needs not to perform calculation and updating as the received two first CQIs are CQIs for two states. Specifically, $CQIm_1$ is a CQI where the second macro base station is mute, while $CQIm_2$ is a CQI where the second macro base station is non-mute.

In a specific embodiment of the present invention, three second CQIs fed back from a pico base station user are $CQIp_1=P_1/(ICI+n)$, $CQIp_2=P_2/(ICI+n)$, and $CQIp_0=P_p/(ICI+n)$. In updating CQIs, assuming a pico base station user under control of the pico base station in the macro base station 1, updated CQIs corresponding to the following four states are as follows: 1) when the first and second macro base stations are all mute, $CQI=CQIp_0$, 2) when the first and second macro base stations are all non-mute, $CQI=CQIp_0/(CQIp_2+CQIp_1+1)$, 3) when the first macro base station is mute and the second macro base station is non-mute, $CQI=CQIp_0/(CQIp_2+1)$, and 4) when the first macro base station is non-mute and the second macro base station is mute, $CQI=CQIp_0/(CQIp_1+1)$.

In deciding a plurality of states of the coordinated group per subband, each transmission point estimates system capacities of different subband mute/non-mute states based on the updated CQIs and provides the capacity estimation result to the decision normal base station or control section. The decision normal base station or control section selects a subband mute/non-mute state corresponding to the optimal system capacity and notifies other transmission points of the transmission decision result. The other transmission points select CQIs corresponding to the actual transmission state in accordance with the transmission decision result and perform scheduling and data transmission.

The method for coordinating inter-cell interference in accordance with a subband mute/non-mute state is similar to those in FIGS. 3 and 4. However, in this method, as compared with the flow illustrated in FIG. 3, there needs to be change in the steps 303, 305 and 306, and as compared with the flow illustrated in FIG. 4, there is change in the steps 406 and 408.

Specifically, as a difference from the step 303, each macro base station performs prescheduling based on CQIs fed back from a macro user of the own station and estimate system capacities of respective subbands of the macro base station in the non-mute state. As a matter to be explained, each CQI fed back from the user includes CQI information of the whole band and CQI information of the subbands. In the following description, it is assumed that the whole band of each macro base station is divided into eight subbands.

In the same manner, each pico base station performs prescheduling based on two CQIs fed back from a pico base station user of the own station and estimates a sum of capacities of the pico base station user in each of the two states, of which one is such that three macro base station in the coordinated group are all non-mute in each subband while the other is such that the three macro base stations are all mute in each subband. That is, the pico base station needs to estimate capacities of totally 16 states about the eight subbands of the three macro base stations, whether each subband is non-mute or mute for the three macro base stations.

Figure 11A:
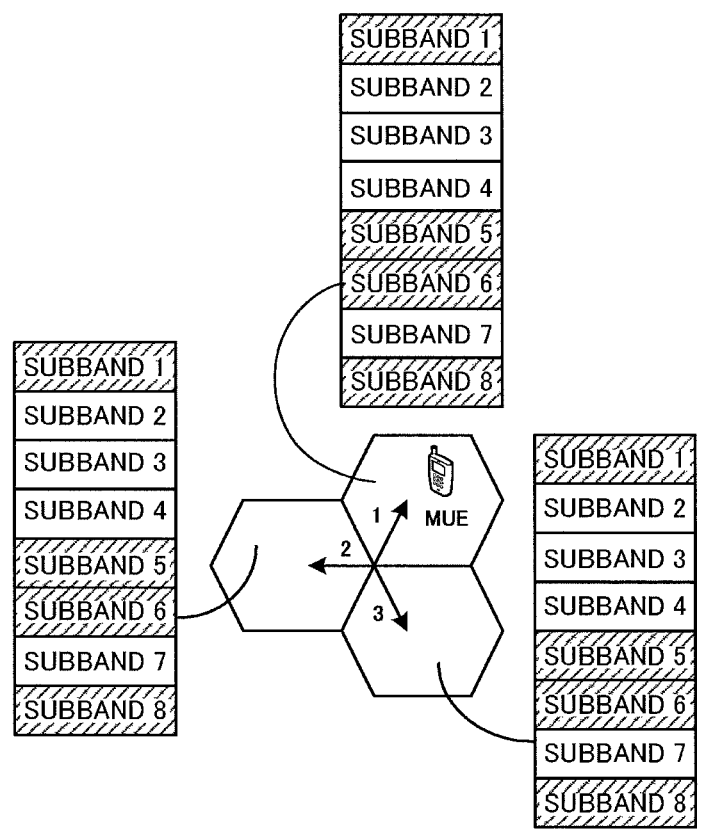
FIG. 11a is a diagram illustrating an actual transmission state per subband in one specific application scenario of the present invention.

As a difference from the step 305, the decision macro base station calculates system capacities of two states of mute/non-mute for each subband of the three macro base stations and compares them. Then, it makes transmission decision per subband, that is, sets an actual transmission state of each subband for all macro base stations in the coordinated group in accordance with a state of greater capacity and notifies all the pico base stations and the other two macro base stations in the coordinated group of the transmission decision result. In one specific embodiment, the actual transmission state is as illustrated in FIG. 11a. Here, subbands 1, 5, 6 and 8 of the three macro base stations are all non-mute and subbands 2, 3, 4 and 7 of the three base stations are all mute.

As a difference from the step 306, the other two macro base stations select CQIs corresponding to the actual transmission states in accordance with the transmission decision result and perform scheduling and data transmission, and all the pico base stations in the coordinated group select CQIs corresponding to the actual transmission states in accordance with the transmission decision result and perform scheduling and data transmission.

Needless to say, eight subbands may be grouped into four groups, that is, a group 1 of subbands 1 and 2, a group 2 of subbands 3 and 4, a group 3 of subbands 5 and 6, and a group 4 of subbands 7 and 8, and the mute/non-mute state may be decided per subband group, though its explanation is omitted here.

In the flow illustrated in FIG. 4, as a difference from the step 406, each macro base station performs prescheduling based on updated CQIs of the four states, estimates a sum of capacities of the macro user of the eight states of the subbands, and each pico base station performs prescheduling based on updated CQIs of the eight states and estimates a sum of capacities of each pico base station user of eight states of the subbands. For example, each pico base station needs to estimate totally 64 system capacities of the pico base station about eight subbands and three macro base stations.

Figure 11B:
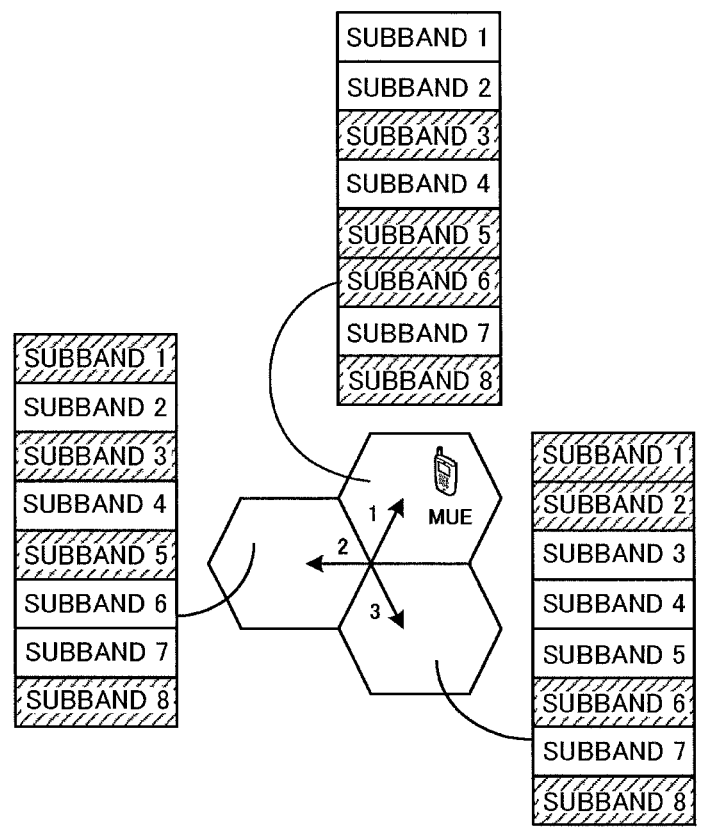
FIG. 11b is a diagram illustrating another actual transmission state per subband in one specific application scenario of the present invention.

As a difference from the step 408, the decision macro base station calculates system capacities of respective subbands of the three macro base stations in the coordinate group in the eight states and makes transmission decision. Then, it sets the actual transmission state of each of the subbands of the three macro base stations in the coordinated group, in accordance with the state of high capacity, and provides the transmission decision result to all the pico base stations and the other two macro base stations in the coordinated group. In one specific embodiment, the actual transmission state of the coordinated group is illustrated in FIG. 11b. That is, for the macro base station 1, the subbands 3, 5, 6 and 8 are non-mute and the other subbands are mute, for the macro base station 2, the subbands 1, 3, 5 and 8 are non-mute and for the macro base station 3, the subbands 1, 2, 6 and 8 are non-mute. The decision macro base station is able to make decision per subband. For example, first, it decides the mute/non-mute state of the three macro base stations in the subband 1, then, decides the mute/non-mute state in the subband 2, and does the same in other subbands.

Further, when the number M of macro base stations in the coordinated group is relatively large (for example, M is 6, 9 or the like), the method illustrated in FIG. 4 is used as a basis to associate CQI feedback directly with a coordinated group state (or, mute/non-mute state). With this structure, it is possible to avoid updating of CQIs and reduce the actual degree of complexity. As a matter to be explained, the following CQI feedback method can be applied to any number M of macro base stations (M is greater than 1).

Method A: Reduce an Amount of Capacity Estimation by Simplifying a Coordinated Group State The following description is made in detail about of the method A, assuming the number of macro base stations=9. Specifically, MUE feeds back nine first CQIs corresponding to nine states. These nine states include the state 0 to state 8. The state 0 is such that 0 MeNB is mute, the state 1 is such that one MeNB is mute, the state 2 is such that two MeNBs are mute, the state 3 is such that three MeNBs are mute, the state 4 is such that four MeNBs are mute, the state 5 is such that five MeNBs are mute, the state 6 is such that six MeNBs are mute, the state 7 is such that seven MeNBs are mute, and the state 8 is such that eight MeNBs are mute. PUE feeds back ten second CQIs corresponding to ten states. These ten states include the state 9 (that is, nine MeNBs are mute) in addition to the nine states of which the CQIs are fed back from the MUE.

Each MUE measures signal strength (for example, RSRP) $P_j$ (j=1, 2, ..., 9) from the j-th MeNB in the nine MeNBs and values of the signal strength are arranged in descending numeric order. It can be assumed, for example, $P1>P2> \ldots >P8>P9$.

In one specific embodiment, for MUE of the MeNB1, the state 0 corresponds to:

$$CQIm_0 = P_1 \bigg/ \left( \sum_{j=2}^{9} P_j + n \right),$$

and
the state 1 corresponds to:

$$CQIm_1 = P_1 \bigg/ \left( \sum_{j=2}^{8} P_j + n \right).$$

CQIm determined in this method is a conservative CQI, and that is, a minimal first CQI in the state 1. As is clear from this, in the state 1, MUE can determine nine CQIs, and $$P_1 \bigg/ \bigg( \sum_{j=2}^{8} P_j + n \bigg)$$

is the minimal one. In each of all the states 2 to 8, a conservative CQI is fed back and such conservative CQIs are expressed as follows:

$$CQIm_2 = P_1 \bigg/ \bigg( \sum_{j=2}^{7} P_j + n \bigg) \quad \text{(state 2)},$$

$$CQIm_3 = P_1 \bigg/ \bigg( \sum_{j=2}^{6} P_j + n \bigg) \quad \text{(state 3)},$$

$$CQIm_4 = P_1 \bigg/ \bigg( \sum_{j=2}^{5} P_j + n \bigg) \quad \text{(state 4)},$$

$$CQIm_5 = P_1 \bigg/ \bigg( \sum_{j=2}^{4} P_j + n \bigg) \quad \text{(state 5)},$$

$$CQIm_6 = P_1 \bigg/ \bigg( \sum_{j=2}^{3} P_j + n \bigg) \quad \text{(state 6)},$$

$$CQIm_7 = P_1 / (P_2 + n) \quad \text{(state 7), and}$$

$$CQIm_8 = P_1 / n \quad \text{(state 8)}$$

Generally speaking, a CQI corresponding to the i-th coordinated group state may be expressed as follows:

$$CQIm_i = \begin{cases} P_j \bigg/ \bigg( \sum_{j1=1, j1 \neq j}^{M-i} P_{j1} + n \bigg), & j \in [1, M-i] \\ P_j \bigg/ \bigg( \sum_{j1=1}^{M-1-i} P_{j1} + n \bigg), & j \in [M-i+1, M] \end{cases}$$

Here, n denotes interference strength outside the coordinated group, and $P_{j1}$ denotes j1-th signal strength among strength values arranged in descending order.

For PUE in PeNB within coverage of MeNB1, the PUE measures signal strength $P_j$ (j=1, 2, ..., 9) from the j-th MeNB in the nine MeNBs. It can be assumed, for example, P1>P2> ... >P8>P9.
The state 0 corresponds to $$CQIp_0 = P_p \bigg/ \bigg( \sum_{j=1}^{9} P_j + n \bigg),$$

the state 1 corresponds to $$CQIp_1 = P_p \bigg/ \bigg( \sum_{j=1}^{8} P_j + n \bigg), \ldots ,$$

the state 8 corresponds to $CQIp_8 = P_p/(P_1+n)$, and
the state 9 corresponds to $CQIp_9 = P_p/n$.

The decision MeNB or control section estimates system capacities in the ten states based on the first CQIs and second CQIs fed back in the method A, and selects a coordinated group state corresponding to the optimal system capacity. In this case, the system capacity estimated for the i-th coordinated group state is expressed as follows.

$$\text{Capacity}_i = \sum_{k=1}^{N_p} CP_{i,k} + k_i \cdot \sum_{j=1}^{9} CM_{i,j} (i = 0, 1, \ldots, 9) \ (k_i = 1 - i/9)$$

In the i-th coordinated group state, i MeNBs are mute. Specifically, $k_i$ denotes an actual rate of non-mute MeNBs in the i-th coordinated group state, $CM_{i,j}$ denotes a system capacity of MeNBj in the i-th coordinated group state, $CP_{i,k}$ denotes a system capacity of PeNB within coverage of MeNB in the coordinated group, in the i-th coordinated group state, and $N_p$ denotes the number of all PeNBs in the coordinated group.

As it is only determined depending on the coordinated group state how may MeNBs in the coordinated group need to be mute, the decision MeNB or control section designates a specific mute MeNB at random and provides the decision result to other MeNBs in the coordinated group thereby to be able to set the mute/non-mute state of the bandwidth of each MeNB for data transmission. For example, when the coordinated group state corresponding to the optimal system capacity is the state 1 (that is, one MeNB is mute), in specific setting, there are nine possibilities. These nine possibilities include the state where MeNB1 is mute, MeNB2 is mute, ..., MeNB9 is mute. The decision MeNB or control section can select, at random, the state that MeNB2 is mute, and make setting.

In another embodiment, when each state of the coordinated group and the number of mute normal base stations $N_{close}$ are determined, it may be possible to adopt one selection method of selecting $N_{close}$ normal base stations from M normal base stations arbitrarily and make the $N_{close}$ normal base stations mute. The value of $N_{close}$ is any of 1, ..., M-1. For example, when M=9 and $N_{close}$ is 1, there are totally nine coordinated group states. These nine coordinated group states include the state where MeNB1 is mute, the state where MeNB2 is mute, the state where MeNB9 is mute. As for other values of $N_{close}$, the method of determining the coordinated group state is similar. MUE decides nine first CQIs. Here, each of the first CQIs is related to the signal strength of MeNB which MUE belongs to, signal strength of other non-mute MeNBs in the corresponding coordinated group state, and interference strength outside the coordinated group. PUE decides ten second CQIs. Here, each of the second CQIs is related to signal strength of the PUE, signal strength of non-mute MeNBs in the corresponding coordinated group state and interference strength outside the coordinated group.

Figure 17:
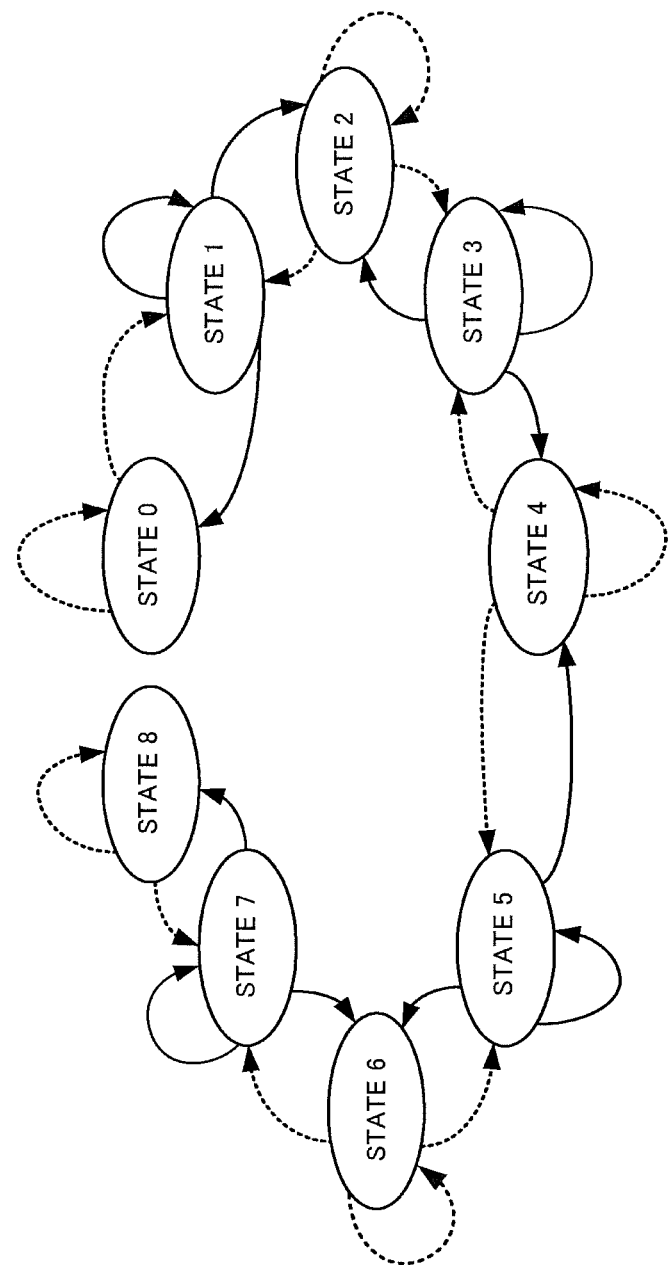
FIG. 17 is a diagram illustrating transition of a coordinated group state according to one embodiment of the present invention.

Method B: Reduce an Amount of CQI Feedback by Utilizing Correlation of Change in Mute/Non-Mute State When the coordinated group state is decided by the number of mute macro base stations, assuming the number of macro base stations in the coordinated group is 9, as illustrated in FIG. 17, if the coordinated group is in the state 0 at the last transmission time, the mute/non-mute state possible at the current feedback time is the state 0 or the state 1. When the coordinated group is in the state 1 at the last transmission time, the mute/non-mute state possible at the current feedback time is the state 0, the state 1 or the state 2. In other words, the state 0, the state 1 and the state 2 are both coordinated group states that are able to be shifted from the state 1. As the process can be analogized, explanation is omitted here.

In the like manner, MUE can feed first CQIs at the current time back to meNB, in accordance with the coordinated group state at the last transmission time. PUE also can feed second CQIs at the current time back to PeNB of the own station, in accordance with the coordinated group state at the last transmission time. For example, when the coordinated group state at the last transmission time is the state 1, at the current time, MUE feeds back:

$$CQIm_0 = P_1 \bigg/ \left( \sum_{j=2}^{9} P_j + n \right),$$

$$CQIm_1 = P_1 \bigg/ \left( \sum_{j=2}^{8} P_j + n \right),$$

$$CQIm_2 = P_1 \bigg/ \left( \sum_{j=2}^{7} P_j + n \right),$$

and PUE feeds back $$CQIp_0 = P_p \bigg/ \left( \sum_{j=1}^{9} P_j + n \right),$$

$$CQIp_1 = P_p \bigg/ \left( \sum_{j=1}^{8} P_j + n \right),$$

$$CQIp_2 = P_p \bigg/ \left( \sum_{j=1}^{7} P_j + n \right).$$

Figure 18:
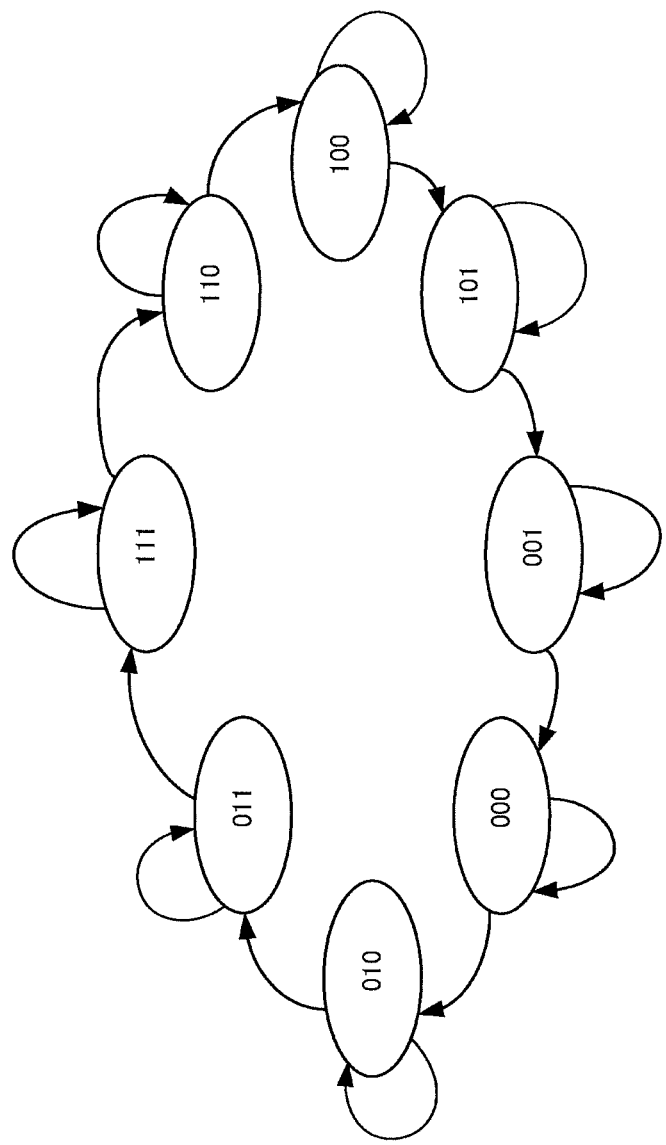
FIG. 18 is a diagram illustrating transition of a coordinated group state according to another embodiment of the present invention.

As for the case where the coordinated group states include any combinations of mute/non-mute states of M macro base stations, assuming that the number of macro base stations in the coordinated group is 3, a non-mute macro base station is indicated by 1 and a mute macro base station is indicated by 0, the eight states in the step 405 are simply expressed as the state 0 (111), the state 1 (110), the state 2 (100), the state 3 (101), the state 4 (001), the state 5 (000), the state 6 (010), and the state 7 (011). FIG. 18 illustrates transition of the above-mentioned coordinated group states. When the coordinated group state at the last transmission time is the state 1, the mute/non-mute state possible at the current feedback time includes the state 1 (where the third macro base station is mute and the first and second macro base stations are non-mute) and the state 2 (where the first macro base station is non-mute and the second and third macro base stations are mute). PUE feeds second CQIs (that is, CQI=$P_p$/(P1+P2+ICI+n) or CQI=$P_p$/(P1+ICI+n)) measured at the current time, back to PeNB of the own station.

Method C: Further Reduce an Amount of CQI Feedback by Adopting Conservative Feedback Based on the Method A Assume that the number of macro base stations in the coordinated group is still 9. In the method A, MUE feeds back nine first CQIs, and PUE feeds back ten second CQIs. In the method C, the nine first CQIs fed back from MUE are grouped in such a manner that each group includes three first CQIs. Assume that $CQI_{m0}$, $CQI_{m1}$ and $CQI_{m2}$ are formed into one group. In this group, the minimal first CQI is selected and fed back to MeNB. This is namely conservative feedback. The ten second CQIs fed back from PUE are grouped in such a manner that each group includes two second CQIs. For example, $CQI_{p0}$ and $CQI_{p1}$ are formed into one group. In this group, a relatively small second CQI is selected and fed back to PeNB. By performing the processing of the method C, MUE feeds three first CQIs back to MeNB and PUE feeds four second CQIs back to PeNB. As a matter to be explained, by performing the conservative feedback with the method C, it is possible to ensure that UE has a low block error ratio (BLER) in receiving data.

As a matter to be explained, the method C is applicable to the flow illustrated in FIG. 4. For example, the three first CQIs decided by the macro user are $CQIm_1=P_1$/(ICI+n), $CQIm_2=P_2$/(ICI+n), and $CQIm_3=P_3$/(ICI+n). Then, the decided three first CQIs are grouped and compared, and the minimal first CQI is selected from each group and is fed back to the corresponding macro base station. In a specific embodiment of the present invention, $CQIm_1$ representative of a desired signal is always fed back, while the other two first CQIs representative of interference are compared as one group, a relatively small first CQI is selected as representing signal strength of the macro base stations 2 and 3.

The four second CQIs decided by the pico base station user are $CQIp_1=P_1$/(ICI+n), $CQIp_2=P_2$/(ICI+n), $CQIp_3=P_3$/(ICI+n), and $CQIp_0=P_p$/(ICI+n). Then, a second CQI to be fed back to the corresponding pico base station is selected from them. Specifically, it can be configured that $CQIp_0$ representative of a desired signal is always fed back, while three second CQIs representative of interference are formed into one group, and a minimal second CQI is selected from them and fed back. Or, out of three second CQIs representative of interference, $CQIp_2$ and $CQIp_3$ are compared as one group and $CQIp_1$ is formed into one group by itself, and a relatively small value out of $CQIp_2$ and $CQIp_3$, and $CQIp_1$ are fed back.

In the above-described plural embodiments (for example, FIGS. 3, 4 and method A), it may be configured that a user of a normal base station decides $N_{feed1}$ first CQIs to feed back and then, selects n1 stronger first CQIs and feeds them back to the normal base station. The above-mentioned n1 meets $N_{feed1} \geq n1 \geq 1$. Needless to say, it may be also configured that a user of a low-power node decides $N_{feed2}$ second CQIs to feed back and then, selects n2 stronger second CQIs and feeds them back to the low-power node. The above-mentioned n2 meets $N_{feed2} \geq n2 \geq 1$.

In the embodiment of the present invention, the mute/non-mute state can have the following two values. That is, (1) when the normal base station is mute, transmission power is 0 and no data transmission is performed, the mute/non-mute state value is 0, and (2) when the normal base station is non-mute and data transmission is performed with specified transmission power, the mute/non-mute state value is 1. In another specific embodiment, the mute/non-mute state can have a plurality of values. That is, (1) when the transmission power is 0, the mute/non-mute state value is 0, (2) when data transmission is performed with specific transmission power, the mute/non-mute state value is 1, and (3) when data transmission is performed with 50% of specified transmission power, the mute/non-mute state value is 0.5. As is clear from this, in a specific embodiment of the present invention, actual transmission power of the normal base station can be set to P×specified transmission power. A value P of the mute/non-mute state can be determined by the actual transmission power. Here, P falls within a range of [0, 1].

Further, the present invention provides a method for coordinating inter-cell interference in a heterogeneous network (HetNet). The method includes:

a step A2 of forming a first normal base station and a plurality of low-power nodes within coverage of the first normal base station in a heterogeneous network into a coordinated group;

a step B2 of a user of the first normal base station measuring signal strength of the first normal base station and one or a plurality of interference normal base stations around the user and feeding back a plurality of corresponding third channel quality indicators (CQIs);

a step C2 of a user of each of the low-power nodes within coverage of the first normal base station measuring signal strength of one or a plurality of normal base stations around the user and feeding back a plurality of corresponding fourth CQIs;

a step D2 of estimating capacities of the first normal base station in mute and non-mute states, based on the third CQIs and the fourth CQIs, and setting a state of higher system capacity among them as an actual transmission state of the first normal base station; and a step E2 of the first normal base station obtaining actual transmission states of the interference normal base stations, deciding an actual CQI corresponding to the actual transmission state of the first normal base station and the interference normal base station and performing data scheduling and transmission in accordance with the actual CQI.

As is clear from this, the coordinated group formed in the step A2 includes only one normal base station (that is, first normal base station).

Figure 12:
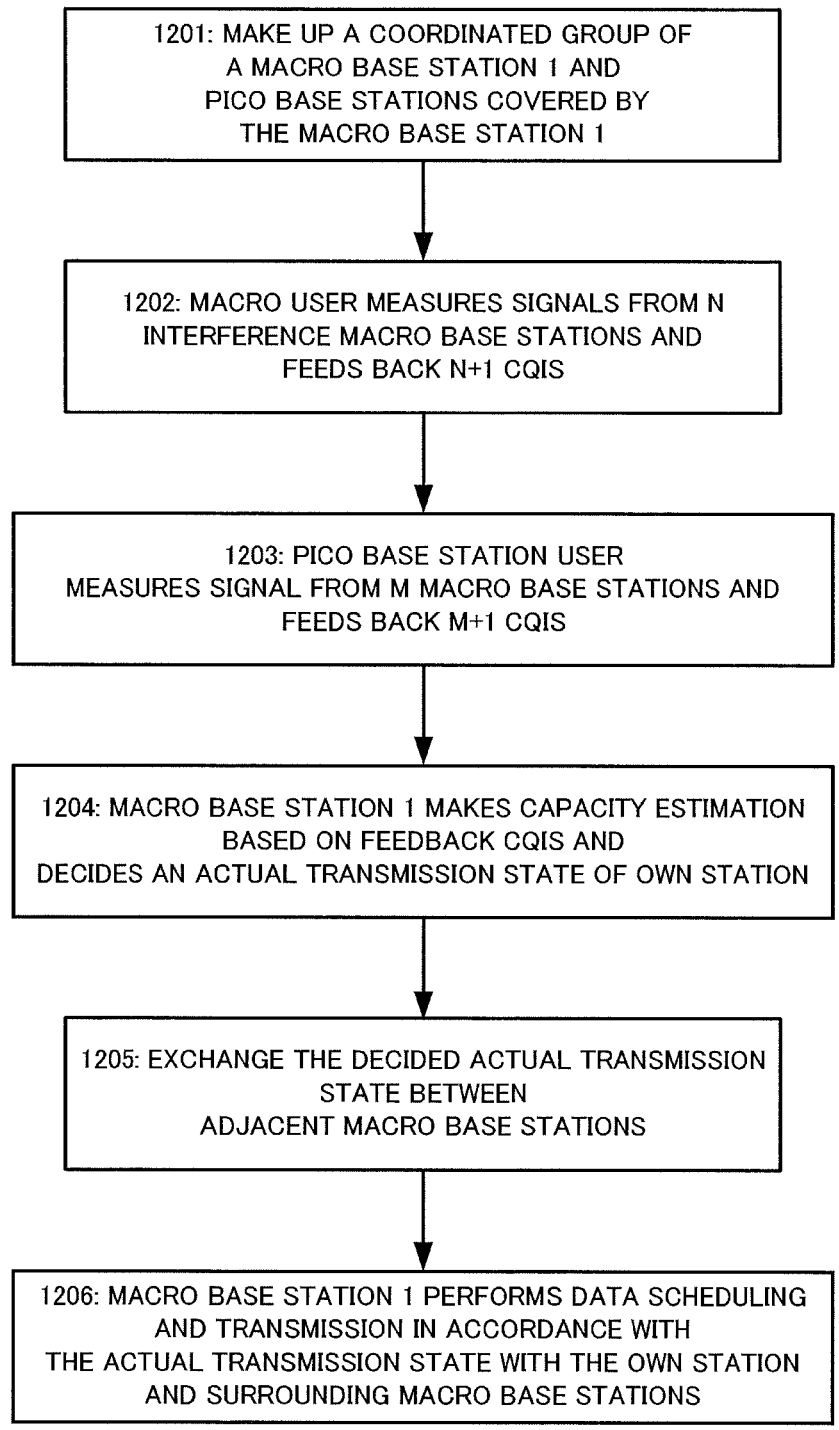
FIG. 12 is a flowchart of a method for coordinating inter-cell interference in one embodiment of the present invention.

An embodiment of the present invention is as illustrated in FIG. 12. That is, one MeNB and PeNBs within coverage of the MeNB cooperate, and MUE and PUE perform multi CQI feedback. Each user feeds back CQIs of surrounding macro base stations in a plurality of mute/non-mute states. With this structure, it is possible to, in scheduling, select an appropriate MCS level based on a CQI corresponding to an actual transmission state, reduce an error bit rate and further increase system capacities. This contributes to solving the problem of mismatch between a CQI used in scheduling and a CQI used in actual transmission. Specifically, the method for coordinating inter-cell interference has the following steps.

In the step 1201, a certain macro base station and pico base stations within coverage of the macro base station are formed into a coordinated group.

In the step 1202, a macro user of the macro base station (called a first macro base station or a macro base station 1) measures reference signal strength from N interference macro base stations and feeds back N+1 CQIs.

In one specific embodiment, neighbor macro base stations can be set in advance as one measurement feedback group. These macro base stations are mutually-interfering interference macro base station. In this case, all macro users under control of the macro base station 1 feed back CQIs relating only to the macro base stations in the measured feedback group.

In another specific embodiment, a macro user can decide corresponding interference macro base stations based on a signal measurement result of the own station. Another macro user may decide different interference macro base stations. In the following description, it is assumed that N=2 and the interference macro base stations for a certain macro user are the second and third macro base stations. In a network situation for performing CQI feedback, when it is assumed that the second and third macro base stations are both mute, CQIs fed back from the macro user include one actual CQI=$P_1$/(ICI+n)) and two CQIs reflecting signals of the interference macro base stations (CQIm$_2$=$P_2$/(ICI+n), CQIm$_3$=$P_3$/(ICI+n)).

Here, $P_1$ represents signal strength received from a serving macro base station by a macro user and $P_2$ and $P_3$ represent signal strength received from corresponding macro base stations by the macro user. ICI represents interference strength received other than the signals from the interference macro base stations and the serving macro base station, and n represents a heat noise. Specifically, ICI may be actual interference strength determined by the macro user based on the actual mute/non-mute state of the macro base stations other than the interference macro base stations and the serving macro base station or may be estimated interference strength measured assuming that all other macro base stations are in the non-mute state.

In the step 1203, a pico base station user of a pico base station within coverage of the first macro base station measures reference signal strength from M macro base stations and feeds back M+1 CQIs.

For example, for the pico base station user, a macro base station which becomes interference for the user is the first macro base station. Assuming that as a network situation for performing CQI feedback, the first macro base station is non-mute, the feedback CQIs include CQIp$_0$=$P_p$/($P_1$+ICI+n) and CQIp$_1$=$P_p$/(ICI+n). Needless to say, the second and third macro base stations may be macro base stations interfering with the pico base station user. That is, the pico base station user determines a macro base station that interferes with the user based on the signal measurement result of the own station and feeds back corresponding CQIs.

In the step 1204, the first macro base station performs prescheduling based on the feedback CQIs and estimates a sum of capacities of macro users where the macro base station is non-mute. Each pico base station within coverage of the first macro base station performs prescheduling based on CQIs of the macro base station in mute and non/mute states, estimates sums of capacities of pico base station users in the two states and transmits the capacity estimation result to the first macro base station. The first macro base station compares system capacities of the own station in mute/non-mute states, selects a state of relatively large capacity and sets the state as an actual transmission state.

In the step, the first macro base station decides the actual transmission state in accordance with the system capacity of the own station and needs not to consider system capacities of other macro base stations. As a matter to be explained, the second and third macro base stations can perform processing similar to the above-mentioned performance, and its explanation is omitted here.

In the step 1205, neighbor macro base stations exchange the decided actual transmission state.

In the step 1206, the first macro base station performs scheduling and data transmission in accordance with the actual transmission state of the own station and surrounding macro base stations.

Specifically, in actual scheduling, a transmission point first updates CQIs of respective users, and then, selects an MCS level by using CQIs corresponding to actual transmission states of the surrounding macro base stations.

For example, a macro user under control of the first macro base station feeds back three CQIs. As for actual transmission states of surrounding macro base stations, when the second and third macro base stations are all mute, scheduling is performed using CQIm$_1$=$P_1$/(ICI+n) directly fed back from the macro user. As for the actual transmission states of the surrounding macro base stations, when the second and third macro base stations are all non-mute, CQI is updated to obtain CQI=CQIm$_1$/(CQIm$_3$+CQIm$_2$+1), and this updated value is used to perform actual scheduling. As for the actual transmission states of the surrounding macro base stations, when the second macro base station is mute and the third macro base station is non-mute, CQI is updated to obtain CQI=CQIm$_1$/(CQIm$_3$+1). As for the actual transmission states of the surrounding macro base stations, when the second macro base station is non-mute and the third macro base station is mute, CQI is updated to obtain CQI=CQIm$_1$/(CQIm$_2$+1).

A pico base station user of a pico base station within coverage of the first macro base station feeds back two CQIs. In this case, when the actual transmission state of the first macro base station is the non-mute state, it uses fed-back $CQI_{p0}$ as it is and performs actual scheduling. When the actual transmission state of the first macro base station is the mute state, it uses fed-back $CQI_{p1}$ as it is and performs actual scheduling.

As a matter to be explained, the CQI feedback equations in the steps 1202 and 1203 are presented merely as examples. The CQI feedback equations may be modified variously as far as thy include information about signal strength of the serving macro base station and/or signal strength of interference macro base stations. Besides, in the step 1204, it is possible to make capacity estimation directly with use of CQIs fed back from users. Accordingly, the processing of updating CQIs may be performed after decision of the actual transmission state. And, it is also possible to determine whether it is necessary to update CQIs or not, in accordance with the actual transmission state. For example, the fed-back $CQIm_1$ can be used directly in actual scheduling. In such a case, there is no need to update the CQI. Further, in the step 1206, it has only to obtain one CQI corresponding to the actual transmission state by updating the CQIs. As compared with the steps 403 and 405, it is possible to reduce an amount of calculation for CQI updating.

Further, the present invention provides a method for coordinating inter-cell interference in a heterogeneous network (HetNet). The method includes:

a step A3 of forming M transmission points into a coordinated group (M is greater than 1), the transmission points including one or a plurality of normal base stations and low-power nodes within coverage of each of the normal base stations in a heterogeneous network;

a step B3 of combining mute/non-mute states of bandwidths of the M transmission points to obtain a plurality of states of the coordinated group;

a step C3 of a user of each of the transmission points in the coordinated group feeding at least one channel quality indicator (CQI) corresponding to the states of the coordinated group to the transmission point;

a step D3 of making capacity estimation of the coordinated group based on the fed-back CQI to obtain system capacities corresponding to the respective states of the coordinated group; and a step of E3 of setting the mute/non-mute states of the bandwidths of the M transmission points in accordance with a coordinated group state corresponding to an optimal system capacity to perform data transmission.

As is clear from this, according to the method, in forming the coordinated group, normal base stations and low-power nodes in the heterogeneous network are equated with each other so that each low-power nodes has two states of mute and non-mute or a plurality of mute/non-mute states corresponding to adjustable transmission power.

In a specific embodiment of the present invention, the plural states of the coordinated group in the step B3 include any combinations of mute/non-mute states of the M transmission points. In this case, in the step C3 mentioned above, each user of each of the transmission points decides M CQIs and each of the CQIs is related to signal strength of the transmission point and interference strength outside the coordinated group.

In another specific embodiment of the present invention, the plural states of the coordinated group in the step B3 are determined by the number of transmission points in the mute state and the number of mute transmission points corresponding to the i-th coordinated group state is i (i=0, 1, . . . , M−1). In this case, in the step C3, each user of each of the transmission points decides M CQIs and each of the CQIs is related to the signal strength of the transmission point to which the user belongs, signal strength of other non-mute transmission points in the i-th coordinated group state and interference strength outside the coordinated group.

In another specific embodiment of the present invention, each state of the coordinated group in the step B3 corresponds to one of such states that the number $N_{close}$ of transmission points in the mute state is decided, $N_{close}$ transmission points are selected arbitrarily from the M transmission points and made mute. The value of $N_{close}$ is any one of 1, . . . , M−1. In this case, in the step C3, each user of each of the transmission points decides M CQIs and each of the CQIs is related to the signal strength of the transmission point to which the user belongs, signal strength of other non-mute transmission points in the corresponding coordinated group state and interference strength outside the coordinated group.

As a matter to be explained, the present invention is not limited to the above-mentioned coordinated group states, but may be any combination of coordinated group states. For example, each coordinated group state is mainly decided by the number of transmission points in the mute state and for a specific $N_{close}$, the specific mute/non-mute states of the transmission points are regarded as one coordinated group state. In a specific embodiment, the coordinated group states include the state where MeNB1 is mute (one of the cases where one transmission point is mute), the state where MeNB2 is mute (another of the cases where one transmission point is mute), the state where two transmission points are mute, . . . , the state where M−1 transmission points are mute.

To sum up, all the solving means (for example, decision of a mute/non-mute state per subband group of the normal base stations as a fundamental unit, transmission decision performed by the control section or the decision macro base station, and the like) proposed in the above-described plural embodiments (for example, see FIGS. 3 and 4 and methods A to C, etc.) where the normal base stations are only considered as to the closed state while the low-power nodes are always open in the non-mute state are applicable to a method for coordinating interference where normal base station and low-power node are equated with each other. There is no need to perform special processing for the low-power node, and there is only need to extend the processing for the normal base stations to all the transmission points in the coordinated group.

Further, each heterogeneous network provided in one embodiment of the present invention includes has at least one coordinated group composed of M (greater than 1) normal base stations and low-power nodes covered by each of the normal base stations, where one of the normal base stations is determined to be a decision normal base station and normal base stations other than the decision normal base station are other normal base stations. Here, at least one normal base station in the coordinated group covers one or a plurality of low-power nodes.

Each of the normal base stations in the coordinated group receives at least one first channel quality indicator (CQI) corresponding to a plural states of the coordinated group fed back from a user of own station to the normal base station, the states of the coordinated group being obtained by combination of mute/non-mute states of bandwidth of the M normal base stations;

each low-power node covered by the normal base stations in the coordinated group receives one or more second CQIs corresponding to the plural states of the coordinated group fed back from each user of own station to the low-power node; and the decision normal base station uses the at least one first CQI and the one or more second CQIs as a basis to make capacity estimation of the coordinated group, obtains a plurality of system capacities corresponding to the respective states of the coordinated group and sets the mute/non-mute states of the bandwidths of the M normal base stations in accordance with a state of the coordinated group corresponding to an optimal system capacity thereby to perform data transmission.

In one specific embodiment, the each low-power node performs calculation and updating of the one or more second CQIs fed back from the user of own station, uses the updated CQIs as a basis to make capacity estimation of the low-power node, and provides a capacity estimation result of the low-power node corresponding to the plural states of the coordinated group, to the normal base station that covers the low-power node.

Each of the other normal base stations uses the at least one first CQI fed back from the user of own station and the capacity estimation result of the low-power node covered by the other normal base station as a basis to make capacity estimation of the other normal base station and provides a capacity estimation result of the other normal base station corresponding to the plural states of the coordinated group to the decision normal base station.

The decision normal base station uses the at least one first CQI fed back from the user of own station and the capacity estimation result of the low-power node covered by the decision normal base station as a basis to make capacity estimation of the decision normal base station, makes capacity estimation of the coordinated group based on the capacity estimation result of each of the normal base stations and obtains system capacities corresponding to the plural states of the coordinated group.

Figure 13:
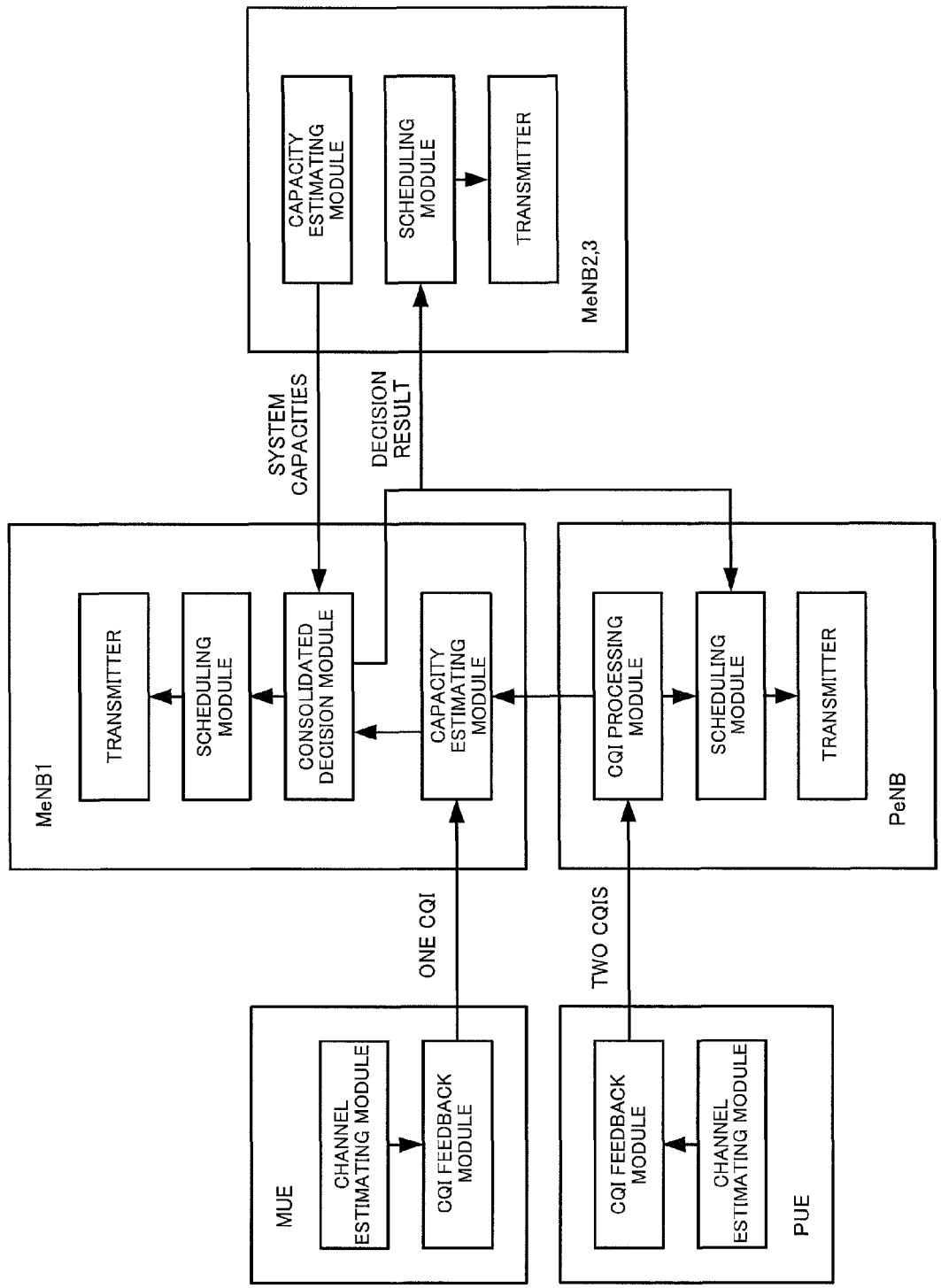
FIG. 13 is a diagram illustrating a configuration of a heterogeneous network in an embodiment of the present invention.

FIG. 13 is a view illustrating the structure of a heterogeneous network of the present invention. The coordinated group includes three normal base stations of MeNB1, MeNB2 and MeNB3. Here, it is assumed that MeNB1 is a decision normal base station. MUE illustrated in FIG. 13 is a macro user of MeNB1, PeNB is a low-power node covered by MeNB1, and PUE is a low-power node user of PeNB. The processing executed by PUE, MUE, PeNB and MeNB can be seen from the flow illustrated in FIG. 3.

Specifically, each MUE includes a channel estimating module and a CQI feedback module. The CQI feedback module provides one CQI to a capacity estimating module of MeNB1. Each PUE also includes a channel estimating module and a CQI feedback module, and the CQI feedback module provides two CQIs to a CQI processing module of PeNB.

Each PeNB includes a CQI processing module, a scheduling module and a transmitter. MeNB1 includes a capacity estimating module, a consolidated decision module, a scheduling module and a transmitter. Each of MeNB2 and MeNB3 includes a capacity estimating module, a scheduling module and a transmitter.

The CQI processing module of PeNB estimates a system capacity of PeNB based on two CQIs fed back from PUE and transmits the estimated system capacity to the capacity estimating module of MeNB1. Needless to say, after receiving two CQI fed back from PUE, the CQI processing module of PeNB may provide the two CQIs directly to the capacity estimating module of MeNB1 without making corresponding capacity estimation.

The capacity estimating module of MeNB1 estimates a system capacity of MeNB1 based on the one CQI fed back from MUE and information provided from the CQI processing module and provides it to the consolidated decision module.

The consolidated decision module of MeNB1 receives the system capacities of MeNB2 and MeNB3 provided from the capacity estimating modules of MeNB2 and MeNB3, respectively, and also receives the system capacity of MeNB1. Then, in accordance with a state corresponding to an optimal system capacity, the consolidated decision module decides the mute/non-mute states of the three MeNBs and notifies the scheduling modules of MeNB1, MeNB2 and MeNB3 and the scheduling module of PeNB of the decision result.

Specifically, the capacity estimating module of MeNB2 or MeNB3 obtains the system capacity of the own station based on information provided by the pico base station of the own station (it may be CQI fed back from the pico base station user or the system capacity of the pico base station) and a CQI fed back from the macro user.

Figure 14:
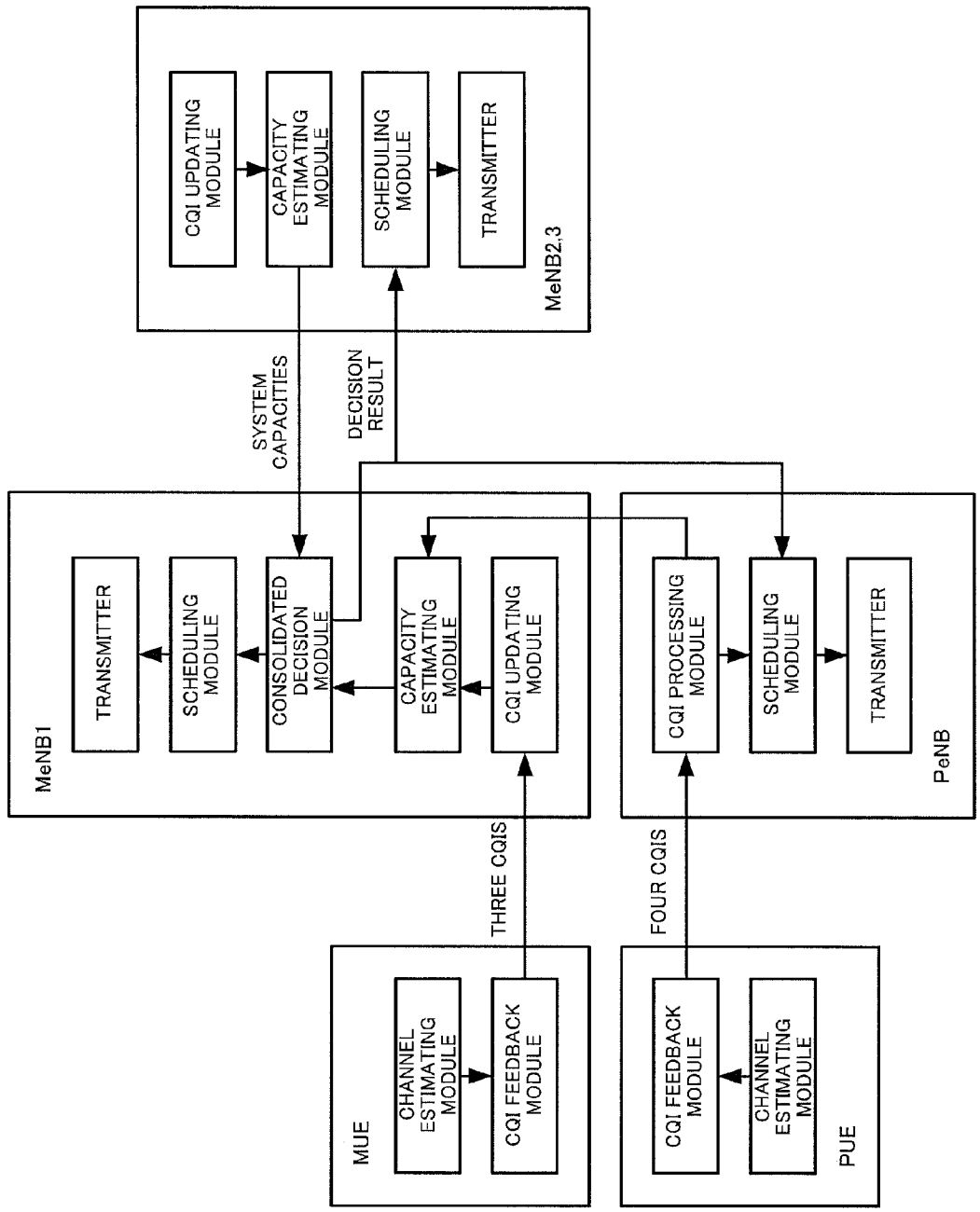
FIG. 14 is a diagram illustrating a configuration of a heterogeneous network in another embodiment of the present invention.

FIG. 14 is a view illustrating the structure of another heterogeneous network of the present invention, which is fundamentally similar to the structure illustrated in FIG. 13. As different points, each of MeNB1, MeNB2 and MeNB3 includes a CQI updating module configured to update three CQIs fed back from MUE of own station, for capacity estimation, and likewise, a CQI processing module of PeNB further includes a CQI updating function of being able to update four CQIs fed back from PUE into eight CQIs in one-to-one correspondence with the states of the coordinated group for capacity estimation. Specifically, the processing executed by PUE, MUE, PeNB and MeNB in FIG. 14 can be seen from the flow illustrated in FIG. 4.

When the number M of macro base stations is relatively larger, M first CQIs fed back from MUE can be made to correspond to the M states of the coordinated group. The different states of the coordinated group have different numbers of mute-state macro base stations, and in each state of the coordinated group, it is not noted which macro base station is mute. For example, if there are six macro base stations, the case where the macro base stations 1 to 4 in the coordinated group are mute and the case where the macro base stations 2 to 5 are mute belong to the same state of the coordinated group. In the same manner, M+1 second CQIs fed back from PUE are made to correspond to M+1 states of the coordinated group. In such a case, after receiving feedback CQIs, MeNB or PeNB does not need to update CQIs. That is, the CQI feedback module of MUE in FIG. 13 feeds the M first CQIs corresponding to the M states of the coordinated group back to the capacity estimating module of MeNB1, and the CQI feedback module of PUE feeds the M+1 second CQIs corresponding to the M+1 states of the coordinated group back to the CQI processing module of PeNB so as to estimate a system capacity of PeNB, while it does not have to update the CQIs.

Further, a heterogeneous network provided by another embodiment of the present invention includes at least one coordinated group composed of M (greater than 1) normal base stations and low-power nodes covered by each of the normal base stations and a control section shared by the M normal base stations. Here, at least one of the normal base stations in the coordinated group covers one or a plurality of low-power nodes.

Each of the normal base stations in the coordinated group receives at least one first channel quality indicator (CQI) corresponding to a plurality of states of the coordinated group fed back from a user of own station to the normal base station, the states of the coordinated group being such as obtained by combination of mute/no-mute states of the bandwidths of the M normal base stations.

Each of the low-power nodes covered by the normal base stations in the coordinated group receives one or more second CQIs corresponding to the plural states in the coordinated group fed back from a user of own station to the low-power node.

The control section uses the at least one first CQI and the one or more second CQIs as a basis to make capacity estimation of the coordinated group, obtains a plurality of system capacities corresponding to the plural states of the coordinated group and sets the mute/non-mute states of the bandwidths of the M normal base stations in accordance with a state of the coordinated group corresponding to an optimal system capacity.

In a specific embodiment, each of the low-power nodes performs calculation and updating on the one or more second CQIs fed back from a user of the own station, estimates capacities of the low-power nodes using updated CQIs and provides a capacity estimation result of the low-power node in the plural states of the coordinated group to the normal base station that covers the low-power node.

Each normal base station performs calculation and updating on the at least one first CQI fed back from a user of the own station, estimates capacities of the normal base stations using updated CQIs and the capacity estimation result of the low-power node covered by the normal base station, and provides a capacity estimation result of the normal base station in the plural states of the coordinated group to the control section.

The control section makes capacity estimation of the coordinated group based on the capacity estimation result of each normal base station and obtains plural system capacities corresponding to the respective states of the coordinated group.

Figure 15:
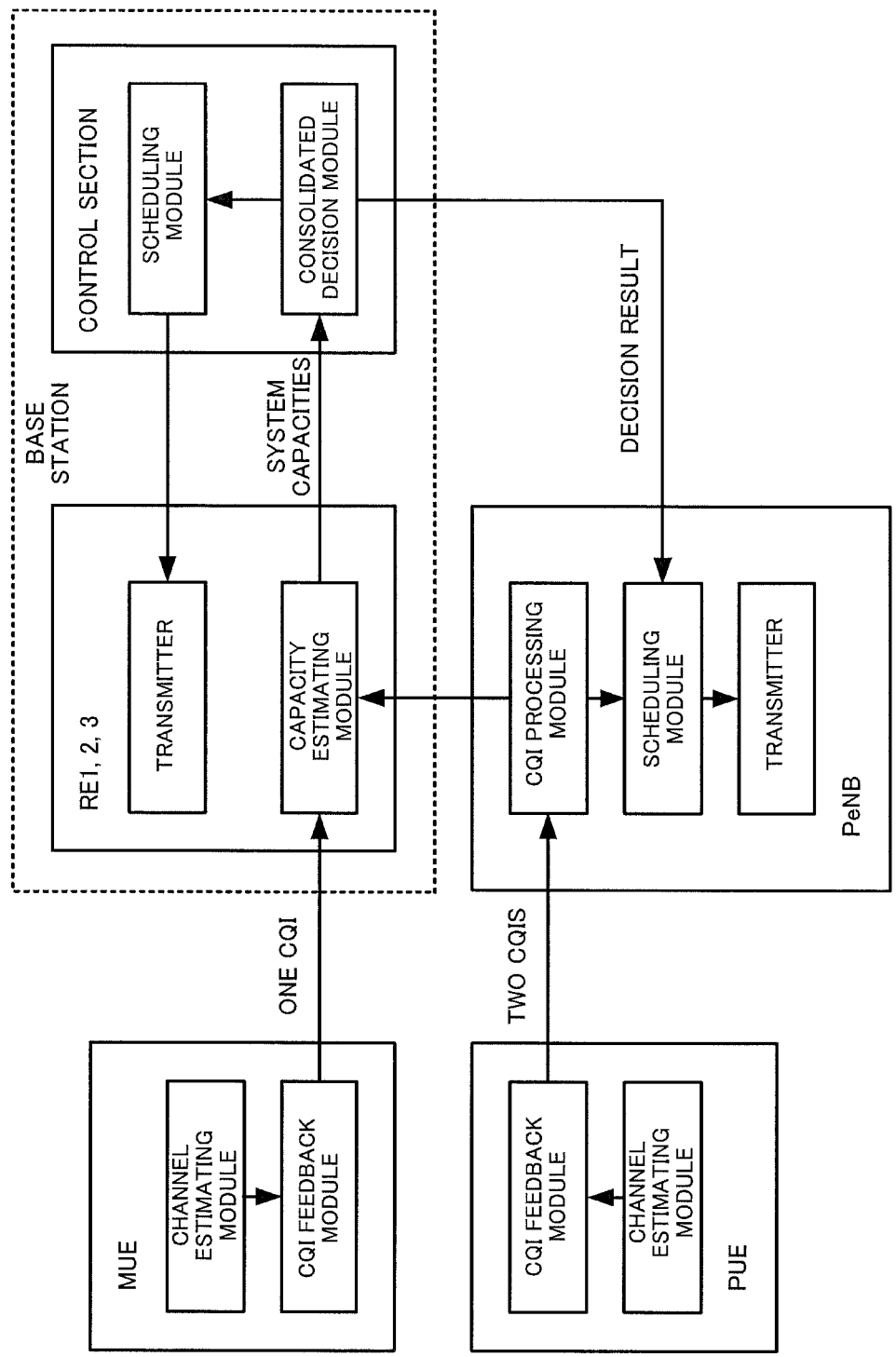
FIG. 15 is a diagram illustrating a configuration of a heterogeneous network in yet another embodiment of the present invention.

FIG. 15 is a view illustrating the structure of another heterogeneous network of the present invention. The coordinated group has three normal base stations (RRE1, RRE2 and RRE3), and a control section shared by these three RREs. It is assumed that RRE1, RRE2, RRE3 and the control section form one complete large base station. Each of the RREs has its own MUE and PeNB covered by itself. PUE is a pico base station user of PeNB. MUE, PUE and PeNB are configured such as illustrated in FIG. 13, and their explanation is omitted here. As different points, each RRE includes a capacity estimating module and a transmitter, and the control section has a consolidated decision module and a scheduling module. The capacity estimating module of each RRE provides a system capacity of RRE to the consolidated decision module, and the consolidated decision module decides a decision result and then instructs the scheduling module in the control section and the scheduling module in PeNB to perform user scheduling in accordance with the CQIs corresponding to actual transmission states. The processing executed by PUE, MUE, PeNB and RRE can be seen from the flow illustrated in FIG. 3.

Figure 16:
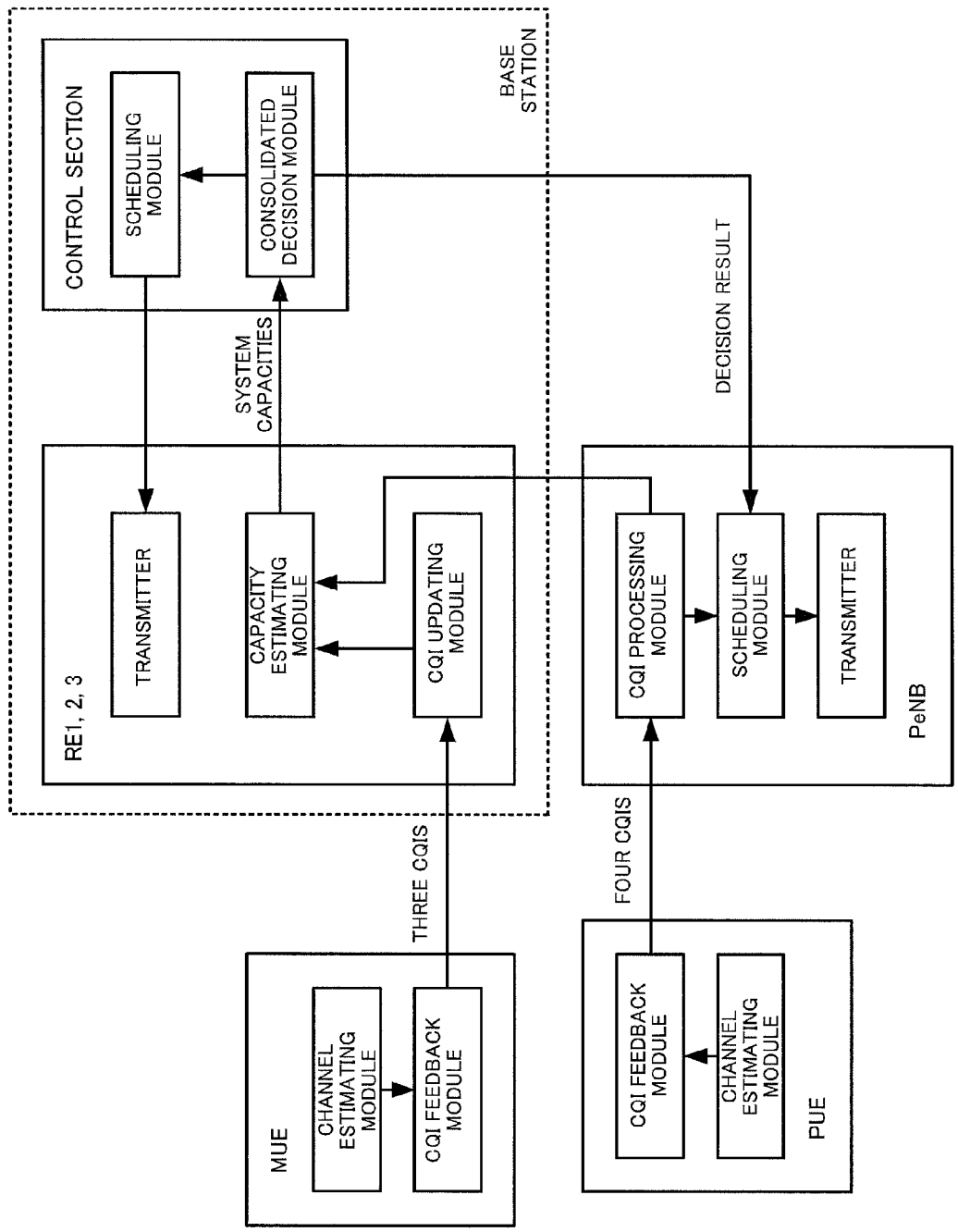
FIG. 16 is a diagram illustrating a configuration of a heterogeneous network in yet another embodiment of the present invention.

FIG. 16 is a view illustrating the configuration of another heterogeneous network of the present invention, which is fundamentally similar to the structure illustrated in FIG. 15. As different points, each RRE further includes a CQI updating module configured to update three CQIs fed back from MUE of own station so as to make capacity estimation, and a CQI processing module of PeNB also has a CQI updating function of updating four CQIs fed back from PUE to be eight CQIs in one-to-one correspondence with the states of the coordinated group for capacity estimation. The processing executed by PUE, MUE, PeNB and RRE can be seen from the flow illustrated in FIG. 4.

The above description has been made only of the preferable embodiments of the present invention and is not intended to limit the protective scope of the present invention. It should be noted that various modifications, equivalent replacement and improvements made in the spirit and principle of the present invention fall within the scope of protection the present invention.

The disclosure of Chinese Patent Application No. 201110204385.X, filed on Jul. 13, 2011, Chinese Patent Application No. 201110218060.7, filed on Jul. 26, 2011, and Chinese Patent Application No. 201110265826.7, filed on Aug. 26, 2011, including the specification, drawings, and abstract, is incorporated herein by reference in its entirety.

The invention claimed is:

1. A method for coordinating inter-cell interference in a heterogeneous network (HetNet), comprising:
    a step A of forming M macro base stations (M is greater than 1) and low-power nodes within coverage of the respective macro base stations in the heterogeneous network into a coordinated group;
    a step B of combining mute/non-mute states of bandwidths of the M macro base stations to obtain a plurality of states of the coordinated group;
    a step C of a user equipment of each of the macro base stations in the coordinated group, feeding at least one first channel quality indicator (CQI) corresponding to the states of the coordinated group back to the macro base station;
    a step D of a user equipment of each of the low-power nodes covered by the macro base stations in the coordinated group, feeding one or more second CQIs corresponding to the states of the coordinated group back to the low-power node;
    a step E of using the at least one first CQI and the one or more second CQIs as a basis to make capacity estimation of the coordinated group and obtaining a plurality of system capacities corresponding to the respective states of the coordinated group; and
    a step F of setting the mute/non-mute states of the bandwidths of the M macro base stations in accordance with a state of the coordinated group corresponding to an optimal system capacity so as to perform data transmission, wherein
    the plurality of states of the coordinated group in the step B include a state where the M macro base stations are all non-mute and a state where the M macro base stations are all mute.

2. The method of claim 1, wherein
    in the step C, the user equipment of the macro base station feeds back the first CQI of the state where the M macro base stations are all non-mute,
    in the step D, the user equipment of the low-power node feeds back two second CQIs of the state where the M macro base stations are all non-mute and the state where the M macro base stations are all mute, and
    the first CQI and the second CQIs are all related to interference strength outside the coordinated group.

3. The method of claim 1, wherein
    the states of the coordinated group in the step B include any combinations of the mute/non-mute states of the M macro base stations,
    in the step C, the user equipment of each of the macro base stations decides M first CQIs, the first CQIs being related to signal strength of j-th (j=1, 2, . . . , M) macro base stations and interference strength outside the coordinated group, and in the step D, the user equipment of each of the low-power nodes decides M+1 second CQIs, the second CQIs being related to signal strength of the low-power node, signal strength of the respective macro base stations in the coordinated group and the interference strength outside the coordinated group.

4. The method of claim 3, wherein the step E comprises:

each of the macro base stations in the coordinated group updating the M first CQIs fed back from the user equipment of each of the macro base stations to be CQIs in one-to-one correspondence with the mute/non-mute sates of any combinations of the mute/non-mute states of other macro base stations in the coordinated group;

each of the low-power nodes updating the M+1 second CQIs fed back from the user equipment of each of the low-power nodes to be CQIs in one-to-one correspondence with the states of the coordinated group; and estimating the system capacities of the coordinated group in the respective states based on the updated CQIs.

5. The method of claim 1, wherein the states of the coordinated group in the step B are determined by a number of mute macro base stations and the number of mute macro base stations corresponding to an i-th state of the coordinated group is i (i=0, 1, ..., M), in the step C, the user equipment of each of the macro base stations decides M first CQIs and an i-th first CQI (i=0, 1, ..., M−1) is related to signal strength of the macro base station to which the user equipment belongs, signal strength of another non-mute macro base station in the i-th state of the coordinated group and interference strength outside the coordinated group;

in the step D, the user equipment of each of the low-power nodes decides M+1 second CQIs and an i-th second CQI (i=0, 1, ..., M) is related to signal strength of the low-power node, the signal strength of the non-mute macro base station in the i-th state of the coordinated group, and the interference strength outside the coordinated group.

6. The method of claim 5, wherein the i-th first CQI is a minimal CQI in the i-th state of the coordinated group measured by the user equipment of the macro base station, and the i-th second CQI is a minimal CQI in the i-th state of the coordinated group measured by the user equipment of the low-power node.

7. The method of claim 1, wherein each of the states of the coordinated group in the step B corresponds to one of selections by, once a number $N_{close}$ of mute macro base stations is decided, selecting $N_{close}$ macro base stations arbitrarily from the M macro base stations and making the $N_{close}$ macro base stations mute, a value of $N_{close}$ being any of 1, ..., M−1, in the step C, the user equipment of each of the macro base stations decides M first CQIs, each of the first CQIs being related to signal strength of the macro base station to which the user equipment belongs, signal strength of another non-mute macro base station in the corresponding state of the coordinated group, and interference strength outside the coordinated group, and in the step D, the user equipment of each of the low-power nodes decides M+1 second CQIs, the second CQIs being related to signal strength of the low-power node, signal strength of non-mute macro base stations in the corresponding state of the coordinated group, the interference strength outside the coordinated group.

8. The method of claim 3, wherein the step C further comprises the user equipment of each of the macro base stations feeding the determined M first CQIs back to the macro base station, and the step D further comprises the user equipment of each of the low-power nodes feeding the determined M+1 second CQIs back to the low-power node, or the step C further comprises the user equipment of each of the macro base stations grouping and comparing the determined M first CQIs, selecting a minimal first CQI from each group and feeding the first CQI back to the macro base station, and the step D further comprises the user equipment of each of the low-power nodes grouping and comparing the determined M+1 second CQIs, selecting a minimal second CQI from each group and feeding the second CQI back to the low-power node.

9. The method of claim 2, wherein the interference strength outside the coordinated group is actual interference strength measured with actual mute/non-mute states of macro base stations outside the coordinated group by a corresponding user equipment, or estimated interference strength measured by the corresponding user equipment assuming the macro base stations outside the coordinated group are all non-mute.

10. The method of claim 1, wherein the step C further comprises the user equipment of each of the macro base stations assuming a plurality of states of the coordinated group shiftable from a state of the coordinated group at a last transmission time as the states of the coordinated group at a current feedback time and feeding first CQIs corresponding to the states of the coordinated group at the current feedback time back to the macro base station, and the step D further comprises the user equipment of each of the low-power nodes assuming a plurality of states of the coordinated group shiftable from the state of the coordinated group at the last transmission time as the states of the coordinated group at the current feedback time and feeding second CQIs corresponding to the states of the coordinated group at the current feedback time back to the low-power node.

11. The method of claim 1, wherein the step C further comprises the user equipment of each of the macro base stations deciding $N_{feed1}$ first CQIs to feed back, selecting strongest n1 (n1 meets $N_{feed1}$>n1≥1) first CQI from the $N_{feed1}$ first CQIs and feeding the strongest n1 first CQI back to the macro base station, and the step D further comprises the user equipment of each of the low-power nodes deciding $N_{feed2}$ second CQIs to feed back, selecting strongest n2 (n2 meets $N_{feed2}$>n2≥1) second CQI from the $N_{feed2}$ second CQIs and feeding the strongest n2 second CQI back to the low-power node.

12. The method of claim 1, wherein the step B further comprises dividing a whole band of each of the macro base stations into K subband groups (K is greater than 1), each of the subband groups including one or a plurality of subbands, and combining the mute/non-mute states of the M macro base stations in each of the subband groups to obtain the states of the coordinated group.

13. The method of claim 1, wherein the step A further comprises providing a control section configured to be shared by the M macro base stations, and the step E further comprises:

one of each of the low-power nodes, a macro base station that covers the low-power node and the control section, using the one or more second CQIs fed back from the user equipment of the low-power node as a basis to make capacity estimation of the low-power node in the states, the macro base station or the control section, using the at least one first CQI fed back from the user equipment of the macro base station and a capacity estimation result of the low-power node covered by the macro base station as a basis to make capacity estimation of the macro base station in the states of the coordinated group, and the control section using the capacity estimation result of each of the macro base stations as a basis to make capacity estimation of the coordinated group and obtain the system capacities corresponding to the states of the coordinated group.

14. The method of claim 1, wherein
the step A further comprises selecting a decision macro base station from the M macro base stations and setting each macro base station other than the decision macro base station to be another macro base station, and
the step E further comprises:
one of each of the low-power nodes, a macro base station that covers the low-power node and the decision macro base station, using the one or more second CQIs fed back from the user equipment of the low-power node as a basis to make capacity estimation of the low-power node in the states,
the other macro base station or the decision macro base station, using the at least one first CQI fed back from the user equipment of the other macro base station and a capacity estimation result of the low-power node covered by the other macro base station as a basis to make capacity estimation of the other macro base station in the states of the coordinated group, and
the decision macro base station using the at least one first CQI fed back from the user equipment of the decision macro base station and a capacity estimation result of the low-power node covered by the decision macro base station as a basis to make capacity estimation of the decision macro base station in the states of the coordinated group and using a capacity estimation result of each of the macro base stations as a basis to make capacity estimation of the coordinated group and obtain the system capacities corresponding to the states of the coordinated group.

15. The method of claim 1, wherein in the step F, an actual CQI is decided corresponding to the state of the coordinated group of the optimal system capacity and data scheduling and transmission is performed in accordance with the actual CQI.

16. The method of claim 1, further comprising:
deciding a degree of importance of the first CQI or the second CQIs;
setting a feedback cycle of each of the first CQI and the second CQIs in accordance with the degree of importance in such a manner that the feedback cycle of a CQI of higher degree of importance is short and the feedback cycle of a CQI of lower degree of importance is long; or
using the CQI of higher degree of importance as a reference CQI to send feedback directly to a corresponding transmission point and to send a difference between the reference CQI and the CQI of lower degree of importance as feedback to a corresponding transmission point.

17. The method of claim 1, wherein the step A further comprises forming M macro base stations co-located in the heterogeneous network and corresponding low-power nodes into the coordinated group or forming neighbor M macro base stations in the heterogeneous network and corresponding low-power nodes into the coordinated group.

18. The method of claim 1, further comprising:
calculating actual transmission power of the macro base stations as P (P falls within [0, 1])×specified transmission power and deciding the mute/non-mute state based on the actual transmission power.

19. A heterogeneous network comprising:
at least one coordinated group including M macro base stations (M is greater than 1) and low-power nodes within coverage of the respective macro base stations; and
a control section configured to be shared by the M macro base stations, wherein at least one macro base station of the macro base stations in the coordinated group covers one or a plurality of low-power nodes,
each of the macro base stations in the coordinated group receives at least one first channel quality indicator (CQI) corresponding to a plurality of states of the coordinated group fed back from a user equipment of each of the macro base stations to the macro base station, the states of the coordinated group being obtained by combining mute/non-mute states of bandwidths of the M macro base stations,
each of the low-power nodes covered by the respective macro base stations in the coordinated group receives one or more second CQIs corresponding to the states of the coordinated group fed back from a user equipment of each of the low-power nodes to the low-power node, and
the control section uses the at least one first CQI and the one or more second CQIs as a basis to make capacity estimation of the coordinated group, obtains a plurality of system capacities corresponding to the respective states of the coordinated group, and sets the mute/non-mute states of the bandwidths of the M macro base stations in accordance with a state of the coordinated group corresponding to an optimal system capacity so as to perform data transmission, wherein
the plurality of states of the coordinated group include a state where the M macro base stations are all non-mute and a state where the M macro base stations are all mute.

20. The heterogeneous network of claim 19, wherein
each of the low-power nodes performs calculation and updating of the one or more second CQIs fed back from the user equipment of each of the low-power nodes, uses the updated CQIs as a basis to make capacity estimation of the low-power node and provides a capacity estimation result of the low-power node in the states of the coordinated group to the macro base station that covers the low-power node,
each of the macro base stations performs calculation and updating of the at least one first CQI fed back from the user equipment of each of the macro base stations, uses the updated CQI and the capacity estimation result of the low-power node covered by the macro base station as a basis to make capacity estimation of the macro base station and provides a capacity estimation result of the macro base station in the states of the coordinated group to the control section, and
the control section uses the capacity estimation result of each of the macro base stations as a basis to make capacity estimation of the coordinated group and obtains the system capacities corresponding to the respective states of the coordinated group.

21. A heterogeneous network comprising:
at least one coordinated group including M macro base stations (M is greater than 1) and low-power nodes within coverage of the respective macro base stations, wherein
one of the macro base stations is a decision macro base station and each macro base station other than the decision macro base station is another macro base station,
at least one macro base station of the macro base stations in the coordinated group covers one or a plurality of low-power nodes,
each of the macro base stations in the coordinated group receives at least one first channel quality indicator (CQI) corresponding to a plurality of states of the coordinated group fed back from a user equipment of each of the macro base stations to the macro base station, the states of the coordinated group being obtained by combining mute/non-mute states of bandwidths of the M macro base stations,
each of the low-power nodes covered by the respective macro base stations in the coordinated group receives one or more second CQIs corresponding to the states of the coordinated group fed back from a user equipment of each of the low-power nodes to the low-power node, and
the decision macro base station uses the at least one first CQI and the one or more second CQIs as a basis to make capacity estimation of the coordinated group, obtains a plurality of system capacities corresponding to the respective states of the coordinated group, and sets the mute/non-mute states of the bandwidths of the M macro base stations in accordance with a state of the coordinated group corresponding to an optimal system capacity so as to perform data transmission, wherein
the plurality of states of the coordinated group include a state where the M macro base stations are all non-mute and a state where the M macro base stations are all mute.

22. The heterogeneous network of claim 21, wherein
each of the low-power nodes performs calculation and updating of the one or more second CQIs fed back from the user equipment of each of the low-power nodes, uses the updated CQIs as a basis to make capacity estimation of the low-power node and provides a capacity estimation result of the low-power node in the states of the coordinated group to the macro base station that covers the low-power node,
the other macro base station uses the at least one first CQI fed back from the user equipment of other macro base station and the capacity estimation result of the low-power node covered by the other macro base station as a basis to make capacity estimation of the other macro base station and provides a capacity estimation result of the other macro base station in the states of the coordinated group to the decision macro base station, and
the decision macro base station uses the at least one first CQI fed back from a user equipment of decision macro base station and a capacity estimation result of a low-power node covered by the decision macro base station as a basis to make capacity estimation of the coordinated group and obtains the system capacities corresponding to the respective states of the coordinated group.

23. A method for coordinating inter-cell interference in a heterogeneous network (HetNet), comprising the steps of:

a step A3 of forming M transmission points (M is greater than 1) into a coordinated group, each of the M transmission points including one or a plurality of macro base stations and low-power nodes covered by the respective macro base stations;
a step B3 of combining mute/non-mute states of bandwidths of the M transmission points to obtain a plurality of states of the coordinated group;
a step C3 of a user equipment of each of the transmission points in the coordinated group feeding at least one channel quality indicator (CQI) corresponding to the states of the coordinated group, back to the transmission point;
a step D3 of making capacity estimation of the coordinated group based on the fed-back CQI to obtain a plurality of system capacities corresponding to the respective states of the coordinated group; and
a step E3 of setting the mute/non-mute states of the bandwidths of the M transmission points in accordance with a state of the coordinated group corresponding to an optimal system capacity so as to perform data transmission, wherein
the plurality of states of the coordinated group in the step B3 include a state where the M macro base stations are all non-mute and a state where the M macro base stations are all mute.

24. The method of claim 23, wherein
the states of the coordinated group in the step B3 include any combination of the mute/non-mute states of the M transmission points, and
in the step C3, a user equipment of each of the transmission points decides M CQIs and each of the CQIs is related to signal strength of the corresponding transmission point and interference strength outside the coordinated group.

25. The method of claim 23, wherein
the states of the coordinated group in the step B3 are decided by a number of mute transmission points and the number of mute transmission points corresponding to an i-th state of the coordinated group is i (i=0, 1, ..., M−1), and
in the step C3, the user equipment of each of the transmission points decides M CQIs and each of the CQIs is related to signal strength of the transmission point to which the user equipment belongs, signal strength of another non-mute transmission point in the i-th state of the coordinated group and interference strength outside the coordinated group.

26. The method of claim 23, wherein
each of the states of the coordinated group in the step B3 corresponds to one of selections by, once a number $N_{close}$ of mute transmission points is decided, selecting $N_{close}$ transmission points arbitrarily from the M transmission points and making the $N_{close}$ transmission points mute, a value of $N_{close}$ being any of 1, ..., M−1, and
in the step C3, the user equipment of each of the transmission points decides M CQIs, each of the CQIs being related to signal strength of the transmission point to which the user equipment belongs, signal strength of another non-mute transmission point in the corresponding state of the coordinated group signal, and interference strength outside the coordinated group.

* * * * *